United States Patent
Hu

(10) Patent No.: US 11,816,870 B2
(45) Date of Patent: Nov. 14, 2023

(54) IMAGE PROCESSING METHOD AND DEVICE, NEURAL NETWORK AND TRAINING METHOD THEREOF, STORAGE MEDIUM

(71) Applicant: BOE TECHNOLOGY GROUP CO., LTD., Beijing (CN)

(72) Inventor: Xinyue Hu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 610 days.

(21) Appl. No.: 16/970,131

(22) PCT Filed: Aug. 1, 2019

(86) PCT No.: PCT/CN2019/098928
§ 371 (c)(1),
(2) Date: Aug. 14, 2020

(87) PCT Pub. No.: WO2021/017006
PCT Pub. Date: Feb. 4, 2021

(65) Prior Publication Data
US 2022/0398783 A1    Dec. 15, 2022

(51) Int. Cl.
*G06T 9/00* (2006.01)
*G06T 7/11* (2017.01)
*G06T 3/40* (2006.01)

(52) U.S. Cl.
CPC ............ *G06T 9/002* (2013.01); *G06T 3/4046* (2013.01); *G06T 7/11* (2017.01); *G06T 2207/20081* (2013.01); *G06T 2207/20084* (2013.01)

(58) Field of Classification Search
CPC ......... G06T 9/002; G06T 3/4046; G06T 7/11; G06T 2207/20081; G06T 2207/20084; G06N 3/04
See application file for complete search history.

(56) References Cited

U.S. PATENT DOCUMENTS

| | | | |
|---|---|---|---|
| 11,328,430 B2* | 5/2022 | Zhou | G06T 7/11 |
| 11,593,614 B2* | 2/2023 | Chollet | G06V 10/454 |
| 2020/0164520 A1* | 5/2020 | Noami | H04N 23/60 |
| 2021/0241027 A1* | 8/2021 | Hu | G06V 30/2504 |
| 2023/0054588 A1* | 2/2023 | Honarvar | G06T 7/174 |

* cited by examiner

*Primary Examiner* — Bobbak Safaipour
(74) *Attorney, Agent, or Firm* — Dilworth & Barrese, LLP.; Michael J. Musella, Esq.

(57) ABSTRACT

Disclosed are an image processing method, an image processing device, a neutral network and a training method thereof, and a storage medium. The image processing method includes: obtaining an input image; performing a segmentation process on the input image via a first encoding-decoding network, to obtain a first output feature map and the first segmented image; concatenating the first output feature map with at least one selected from the group consisting of the input image and the first segmented image, to obtain an input of the second encoding-decoding network; and performing a segmentation process on the input of the second encoding-decoding network via a second encoding-decoding network, to obtain the second segmented image. And the first encoding-decoding network and the second encoding-decoding network forms a neural network.

18 Claims, 5 Drawing Sheets

S210 — Performing a segmentation process on the input image via the first encoding-decoding network, to obtain a first output feature map and the first segmented image S220 — Concatenating the first output feature map with at least one selected from the group consisting of the input image and the first segmented image, to obtain an input of the second encoding-decoding network S230 — Performing a segmentation process on the input of the second encoding-decoding network via the second encoding-decoding network, to obtain the second segmented image

IMAGE PROCESSING METHOD AND DEVICE, NEURAL NETWORK AND TRAINING METHOD THEREOF, STORAGE MEDIUM

TECHNICAL FIELD

The embodiments of the present disclosure relate to an image processing method, an image processing device, a neural network and a training method thereof, and a storage medium.

BACKGROUND

Currently, deep learning technology based on artificial neural networks has made great progress in fields such as image classification, image capture and search, facial recognition, age and speech recognition, etc. The advantage of deep learning is that it can solve very different technical problems by using a common structure with a relatively similar system. A convolutional neural network (CNN) is an artificial neural network that has been developed in recent years and has attracted wide attention. The CNN is a special image recognition method and is a very effective network with forward feedback. At present, the application scope of the CNN is not only limited to the field of image recognition, and the CNN can also be applied in the application directions such as face recognition, text recognition, image processing, etc.

SUMMARY

At least one embodiment of the present disclosure provides an image processing method, which includes: obtaining an input image; and processing the input image via a neural network to obtain a first segmented image and a second segmented image, wherein the neural network includes two encoding-decoding networks, the two encoding-decoding networks includes a first encoding-decoding network and a second encoding-decoding network, and an input of the first encoding-decoding network includes the input image; and the processing the input image via the neural network to obtain the first segmented image and the second segmented image, includes: performing a segmentation process on the input image via the first encoding-decoding network, to obtain a first output feature map and the first segmented image; concatenating the first output feature map with at least one selected from the group consisting of the input image and the first segmented image, to obtain an input of the second encoding-decoding network; and performing a segmentation process on the input of the second encoding-decoding network via the second encoding-decoding network, to obtain the second segmented image.

For example, in the image processing method provided by some embodiments of the present disclosure, each encoding-decoding network in the two encoding-decoding networks includes an encoding meta-network and a decoding meta-network; the segmentation process of the first encoding-decoding network includes: performing an encoding process on the input image via the encoding meta-network of the first encoding-decoding network to obtain a first encoded feature map; and performing a decoding process on the first encoded feature map via the decoding meta-network of the first encoding-decoding network to obtain an output of the first encoding-decoding network, wherein the output of the first encoding-decoding network includes the first segmented image; and the segmentation process of the second encoding-decoding network includes: performing an encoding process on the input of the second encoding-decoding network via the encoding meta-network of the second encoding-decoding network to obtain a second encoded feature map; and performing a decoding process on the second encoded feature map via the decoding meta-network of the second encoding-decoding network to obtain an output of the second encoding-decoding network, wherein the output of the second encoding-decoding network includes the second segmented image.

For example, in the image processing method provided by some embodiments of the present disclosure, The image processing method according to claim 2, wherein the encoding meta-network includes N encoding sub-networks and N−1 down-sampling layers, the N encoding sub-networks are sequentially connected, each of the N−1 down-sampling layers is configured to connect two adjacent encoding sub-networks, N is an integer and N≥2; and the encoding process of the encoding meta-network includes: processing, via an i-th encoding sub-network in the N encoding sub-networks, an input of the i-th encoding sub-network, to obtain an output of the i-th encoding sub-network; performing a down-sampling process on the output of the i-th encoding sub-network via a down-sampling layer that connects the i-th encoding sub-network with an (i+1)-th encoding sub-network in the N encoding sub-networks, to obtain a down-sampling output of the i-th encoding sub-network; and processing, via the (i+1)-th encoding sub-network, the down-sampling output of the i-th encoding sub-network, to obtain an output of the (i+1)-th encoding sub-network; wherein i is an integer and 1≤i≤N−1, an input of the first encoding sub-network in the N encoding sub-networks includes the input of the first encoding-decoding network or the input of the second encoding-decoding network; except the first encoding sub-network, the input of the (i+1)-th encoding sub-network includes the down-sampling output of the i-th encoding sub-network; and the first encoded feature map or the second encoded feature map includes the output of the N encoding sub-networks.

For example, in the image processing method provided by some embodiments of the present disclosure, in a case where N>2, the decoding meta-network includes N−1 decoding sub-networks and N−1 up-sampling layers, the N−1 decoding sub-networks are sequentially connected, the N−1 up-sampling layers include a first up-sampling layer and N−2 second up-sampling layers, the first up-sampling layer is configured to connect a first decoding sub-network in the N−1 decoding sub-networks with an N-th encoding sub-network in the N encoding sub-networks, and each of the second up-sampling layers is configured to connect two adjacent decoding sub-networks; and the decoding process of the decoding meta-network includes: obtaining an input of a j-th decoding sub-network in the N−1 decoding sub-networks; and processing, via the j-th decoding sub-network, the input of the j-th decoding sub-network, to obtain an output of the j-th decoding sub-network; wherein j is an integer and 1≤j≤N−1, the output of the first encoding-decoding network or the output of the second encoding-decoding network includes an output of an (N−1)-th decoding sub-network in the N−1 decoding sub-networks; in a case where j=1, the obtaining the input of the j-th decoding sub-network in the N−1 decoding sub-networks includes: performing, via the first up-sampling layer, an up-sampling process on an output of the N-th encoding sub-network, to obtain an up-sampling input of the j-th decoding sub-network; and concatenating the up-sampling input of the j-th decoding sub-network with an output of a (N-j)-th encoding sub-network in the N encoding sub-networks, and taking a concatenate result as the input of the j-th decoding sub-network; and in a case where 1<j≤N−1, the obtaining the input of the j-th decoding sub-network in the N−1 decoding sub-networks includes: performing, via the second up-sampling layer that connects a j-th decoding sub-network with a (j−1)-th decoding sub-network in the N−1 decoding sub-networks, an up-sampling process on an output of a (j−1)-th decoding sub-network, to obtain an up-sampling input of the j-th decoding sub-network; and concatenating the up-sampling input of the j-th decoding sub-network with an output of a (N-j)-th encoding sub-network in the N encoding sub-networks, and taking a concatenate result as the input of the j-th decoding sub-network.

For example, in the image processing method provided by some embodiments of the present disclosure, a size of the up-sampling input of the j-th decoding sub-network is the same as a size of the output of the (N-j)-th encoding sub-network, where 1≤j≤N−1.

For example, in the image processing method provided by some embodiments of the present disclosure, in a case where N=2, the encoding meta-network further includes a second encoding sub-network, and the decoding meta-network includes a first decoding sub-network and a first up-sampling layer that connects the first decoding sub-network with the second encoding sub-network; and the decoding process of the decoding meta-network includes: performing, via the first up-sampling layer that connects the first decoding sub-network with the second encoding sub-network, an up-sampling process on an output of the second encoding sub-network, to obtain an up-sampling input of the first decoding sub-network; concatenating the up-sampling input of the first decoding sub-network with an output of the first encoding sub-network, and taking a concatenate result as the input of the first decoding sub-network, wherein a size of the up-sampling input of the first decoding sub-network is the same as a size of the output of the first encoding sub-network; and processing, via the first decoding sub-network, the input of the first decoding sub-network, to obtain an output of the first decoding sub-network; wherein the output of the first encoding-decoding network or the output of the second encoding-decoding network includes the output of the first decoding sub-network.

For example, in the image processing method provided by some embodiments of the present disclosure, each sub-network in the N encoding sub-networks and the N−1 decoding sub-networks includes: a first convolution module and a residual module; and a processing of each sub-network includes: processing, via the first convolution module, an input of a sub-network including the first convolution module, to obtain a first intermediate output; and performing, via the residual module, a residual process on the first intermediate output, to obtain an output of the sub-network.

For example, in the image processing method provided by some embodiments of the present disclosure, the residual module includes a plurality of second convolution modules; and the performing, via the residual module, the residual process on the first intermediate output, to obtain the output of the sub-network, includes: processing, via the plurality of second convolution modules, the first intermediate output, to obtain a second intermediate output; and performing a residual connection addition process on the first intermediate output and the second intermediate output, to obtain the output of the sub-network.

For example, in the image processing method provided by some embodiments of the present disclosure, the processing of each of the first convolution module and the plurality of second convolution modules includes: a convolution process, an activation process and a batch normalization process.

For example, in the image processing method provided by some embodiments of the present disclosure, the sizes of the input and the output of each decoding sub-network in the decoding meta-network are the same, and the sizes of the input and the output of each encoding sub-network in the encoding meta-network are the same.

For example, in the image processing method provided by some embodiments of the present disclosure, each encoding-decoding network in the two encoding-decoding networks further includes a merge module; the merge module in the first encoding-decoding network is configured to process the first output feature map to obtain the first segmented image; and the performing the segmentation process on the input of the second encoding-decoding network via the second encoding-decoding network, to obtain the second segmented image, includes: performing the segmentation process on the input of the second encoding-decoding network via the second encoding-decoding network, to obtain a second output feature map; and processing the second output feature map via the merge module in the second encoding-decoding network, to obtain the second segmented image.

For example, in the image processing method provided by some embodiments of the present disclosure, the first segmented image corresponds to a first region of the input image, the second segmented image corresponds to a second region of the input image, and the first region of the input image surrounds the second region of the input image.

At least one embodiment of the present disclosure further provides a training method of a neural network, which includes: obtaining a training input image; and training a neural network to be trained by utilization of the training input image, to obtain the neural network in the image processing method according to any one of the embodiments of the present disclosure.

For example, in the training method provided by some embodiments of the present disclosure, the training the neural network to be trained by utilization of the training input image includes: processing the training input image via the neural network to be trained, to obtain a first training segmented image and a second training segmented image; calculating a system loss value of the neural network to be trained through a system loss function based on a first reference segmented image of the training input image, a second reference segmented image of the training input image, the first training segmented image and the second training segmented image; and tuning parameters of the neural network to be trained based on the system loss value, wherein the first training segmented image corresponds to the first reference segmented image, and the second training segmented image corresponds to the second reference segmented image.

For example, in the training method provided by some embodiments of the present disclosure, the system loss function includes a first segmentation loss function and a second segmentation loss function; and each segmentation loss function in the first segmentation loss function and the second segmentation loss function includes: a binary cross entropy loss function and a soft dice loss function.

For example, in the training method provided by some embodiments of the present disclosure, the first segmentation loss function is expressed as:

$$L_{01} = \lambda_{11} \cdot L_{11} + \lambda_{12} \cdot L_{21},$$

where $L_{01}$ indicates the first segmentation loss function, $L_{11}$ represents the binary cross entropy loss function in the first segmentation loss function, $\lambda_{11}$ represents a weight of the binary cross entropy loss function in the first segmentation loss function, $L_{21}$ indicates the soft dice loss function in the first segmentation loss function, and $\lambda_{12}$ represents a weight of the soft dice loss function in the first segmentation loss function;

the binary cross entropy loss function $L_{11}$ in the first segmentation loss function is expressed as:

$$L_{11} = -\sum_{m1}\sum_{n1}[y_{m1n1}\cdot \log\, x_{m1n1} + (1-y_{m1n1})\cdot \log\,(1-x_{m1n1})],$$

the soft dice loss function $L_{21}$ in the first segmentation loss function is expressed as:

$$L_{21} = -\sum_{m1}\sum_{n1}[(2x_{m1n1}y_{m1n1})/(x_{m1n1}^2 + y_{m1n1}^2)],$$

where $x_{m1n1}$ indicates a value of a pixel in an m1-th row and an n1-th column in the first training segmented image, and $y_{m1n1}$ indicates a value of a pixel in an m1-th row and an n1-th column in the first reference segmented image; and the second segmentation loss function is expressed as:

$$L_{02}=\lambda_{21}\cdot L_{12}+\lambda_{22}\cdot L_{22},$$

where $L_{02}$ indicates the second segmentation loss function, $L_{12}$ represents the binary cross entropy loss function in the second segmentation loss function, $\lambda_{21}$ represents a weight of the binary cross entropy loss function in the second segmentation loss function, $L_{22}$ indicates the soft dice loss function in the second segmentation loss function, and $\lambda_{22}$ represents a weight of the soft dice loss function in the second segmentation loss function;

the binary cross entropy loss function $L_{12}$ in the second segmentation loss function is expressed as:

$$L_{12} = -\sum_{m2}\sum_{n2}[y_{m2n2}\cdot \log\, x_{m2n2} + (1-y_{m2n2})\cdot \log\,(1-x_{m2n2})],$$

the soft dice loss function L22 in the second segmentation loss function is expressed as:

$$L_{22} = -\sum_{m2}\sum_{n2}[(2x_{m2n2}y_{m2n2})/(x_{m2n2}^2 + y_{m2n2}^2)],$$

where $x_{m2n2}$ indicates a value of a pixel in an m2-th row and an n2-th column in the second training segmented image, and $y_{m2n2}$ indicates a value of a pixel in an m2-th row and an n2-th column in the second reference segmented image.

For example, in the training method provided by some embodiments of the present disclosure, the system loss function is expressed as:

$$L=\lambda_{01}\cdot L_{01}+\lambda_{02}\cdot L_{02},$$

where $L_{01}$ and $L_{02}$ indicate the first segmentation loss function and the second segmentation loss function, respectively, and $\lambda_{01}$ and $\lambda_{02}$ indicate a weight of the first segmentation loss function and a weight of the second segmentation loss function in the system loss function, respectively.

For example, in the training method provided by some embodiments of the present disclosure, the obtaining the training input image includes: obtaining an initial training input image; and performing a pre-process and a data augment process on the initial training input image, to obtain the training input image.

At least one embodiment of the present disclosure further provides an image processing device, which includes: a memory, configured to store computer readable instructions non-transitorily; and a processor, configured to execute the computer readable instructions, wherein upon the computer readable instructions being executed by the processor, the image processing method according to any one of the embodiments of the present disclosure or the training method according to any one of the embodiments of the present disclosure is executed.

At least one embodiment of the present disclosure further provides a storage medium, storing computer readable instructions non-transitorily, wherein upon the computer readable instructions stored non-transitorily being executed by a computer, instructions for the image processing method according to any one of the embodiments of the present disclosure or instructions for the training method according to any one of the embodiments of the present disclosure are executed.

At least one embodiment of the present disclosure further provides a neural network, which includes: two encoding-decoding networks and a concatenating layer, wherein the two encoding-decoding networks includes a first encoding-decoding network and a second encoding-decoding network; the first encoding-decoding network is configured to perform a segmentation process on an input image to obtain a first output feature map and a first segmented image; the concatenating layer is configured to concatenate the first output feature map with at least one selected from the group consisting of the input image and the first segmented image to obtain an input of the second encoding-decoding network; and the second encoding-decoding network is configured to perform a segmentation process on the input of the second encoding-decoding network to obtain the second segmented image.

For example, in the neural network provided by some embodiments of the present disclosure, each encoding-decoding network in the two encoding-decoding networks includes an encoding meta-network and a decoding meta-network; the encoding meta-network of the first encoding-decoding network is configured to perform an encoding process on the input image to obtain a first encoded feature map; the decoding meta-network of the first encoding-decoding network is configured to perform a decoding process on the first encoded feature map to obtain an output of the first encoding-decoding network, wherein the output of the first encoding-decoding network includes the first segmented image; the encoding meta-network of the second encoding-decoding network is configured to perform an encoding process on the input of the second encoding-decoding network to obtain a second encoded feature map; and the decoding meta-network of the second encoding-decoding network is configured to perform a decoding process on the second encoded feature map to obtain an output of the second encoding-decoding network, wherein the output of the second encoding-decoding network includes the second segmented image.

For example, in the neural network provided by some embodiments of the present disclosure, the encoding meta-network includes N encoding sub-networks and N−1 down-sampling layers, the N encoding sub-networks are sequentially connected, each of the N−1 down-sampling layers is configured to connect two adjacent encoding sub-networks, N is an integer and N≥2; and an i-th encoding sub-network in the N encoding sub-networks is configured to process an input of the i-th encoding sub-network to obtain an output of the i-th encoding sub-network; a down-sampling layer that connects the i-th encoding sub-network with an (i+1)-th encoding sub-network in the N encoding sub-networks is configured to perform a down-sampling process on the output of the i-th encoding sub-network to obtain a down-sampling output of the i-th encoding sub-network; the (i+1)-th encoding sub-network is configured to process the down-sampling output of the i-th encoding sub-network to obtain an output of the (i+1)-th encoding sub-network; wherein i is an integer and 1≤i≤N−1, an input of the first encoding sub-network in the N encoding sub-networks includes the input of the first encoding-decoding network or the input of the second encoding-decoding network; except the first encoding sub-network, the input of the (i+1)-th encoding sub-network includes the down-sampling output of the i-th encoding sub-network; and the first encoded feature map or the second encoded feature map includes the output of the N encoding sub-networks.

For example, in the neural network provided by some embodiments of the present disclosure, in a case where N>2, the decoding meta-network includes N−1 decoding sub-networks and N−1 up-sampling layers, the N−1 decoding sub-networks are sequentially connected, the N−1 up-sampling layers include a first up-sampling layer and N−2 second up-sampling layers, the first up-sampling layer is configured to connect a first decoding sub-network in the N−1 decoding sub-networks with an N-th encoding sub-network in the N encoding sub-networks, and each of the second up-sampling layers is configured to connect two adjacent decoding sub-networks; each encoding-decoding network in the two encoding-decoding networks further includes N−1 sub-concatenating layers corresponding to the N−1 decoding sub-networks in the decoding meta-network; a j-th decoding sub-network in the N−1 decoding sub-networks is configured to process an input of the j-th decoding sub-network to obtain an output of the j-th decoding sub-network, wherein j is an integer and 1≤j≤N−1, the output of the first encoding-decoding network or the output of the second encoding-decoding network includes an output of an (N−1)-th decoding sub-network in the N−1 decoding sub-networks; the first up-sampling layer is configured to perform an up-sampling process on an output of the N-th encoding sub-network to obtain an up-sampling input of the first decoding sub-network; the second up-sampling layer that connects a j-th decoding sub-network with a (j−1)-th decoding sub-network in the N−1 decoding sub-networks is configured to perform an up-sampling process on an output of a (j−1)-th decoding sub-network to obtain an up-sampling input of the j-th decoding sub-network, where j is an integer and 1<j≤N−1; and a j-th sub-concatenating layer in the N−1 sub-concatenating layers is configured to concatenate the up-sampling input of the j-th decoding sub-network with an output of a (N−j)-th encoding sub-network in the N encoding sub-networks to obtain a concatenate result which serves as the input of the j-th decoding sub-network, where j is an integer and 1≤j≤N−1.

For example, in the neural network provided by some embodiments of the present disclosure, a size of the up-sampling input of the j-th decoding sub-network is the same as a size of the output of the (N−j)-th encoding sub-network, where 1≤j≤N−1.

For example, in the neural network provided by some embodiments of the present disclosure, in a case where N=2, the encoding meta-network further includes a second encoding sub-network, and the decoding meta-network includes a first decoding sub-network and a first up-sampling layer that connects the first decoding sub-network and the second encoding sub-network; each encoding-decoding network in the two encoding-decoding networks further includes a first sub-concatenating layer corresponding to the first decoding sub-network of the decoding meta-network; the first up-sampling layer that connects the first decoding sub-network with the second encoding sub-network is configured to perform an up-sampling process on an output of the second encoding sub-network to obtain an up-sampling input of the first decoding sub-network; the first sub-concatenating layer is configured to concatenate the up-sampling input of the first decoding sub-network with an output of the first encoding sub-network to obtain a concatenate result which serves as the input of the first decoding sub-network, wherein a size of the up-sampling input of the first decoding sub-network is the same as a size of the output of the first encoding sub-network; and the first decoding sub-network is configured to process the input of the first decoding sub-network to obtain an output of the first decoding sub-network; wherein the output of the first encoding-decoding network or the output of the second encoding-decoding network includes the output of the first decoding sub-network.

For example, in the neural network provided by some embodiments of the present disclosure, each sub-network in the N encoding sub-networks and the N−1 decoding sub-networks includes: a first convolution module and a residual module; the first convolution module is configured to process an input of a sub-network including the first convolution module to obtain a first intermediate output; and the residual module is configured to perform a residual process on the first intermediate output to obtain an output of the sub-network.

For example, in the neural network provided by some embodiments of the present disclosure, the residual module includes a plurality of second convolution modules and a residual addition layer; the plurality of second convolution modules are configured to process the first intermediate output to obtain a second intermediate output; and the residual addition layer is configured to perform a residual connection addition process on the first intermediate output and the second intermediate output to obtain the output of the sub-network.

For example, in the neural network provided by some embodiments of the present disclosure, each of the first convolution module and the plurality of second convolution modules includes: a convolution layer, an activation layer and a batch normalization layer; the convolution layer is configured to perform a convolution process, the activation layer is configured to perform an activation process, and the batch normalization layer is configured to perform a batch normalization process.

For example, in the neural network provided by some embodiments of the present disclosure, the sizes of the input and the output of each decoding sub-network in the decoding meta-network are the same, and the sizes of the input and the output of each encoding sub-network in the encoding meta-network are the same.

For example, in the neural network provided by some embodiments of the present disclosure, each encoding-decoding network in the two encoding-decoding networks further includes a merge module; the merge module in the first encoding-decoding network is configured to obtain the first segmented image by processing the first output feature map; and that the second encoding-decoding network is configured to perform a segmentation process on the input of the second encoding-decoding network to obtain the second segmented image, includes: the second encoding-decoding network is configured to perform the segmentation process on the input of the second encoding-decoding network to obtain a second output feature map; and the merge module in the second encoding-decoding network is configured to process the second output feature map to obtain the second segmented image.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
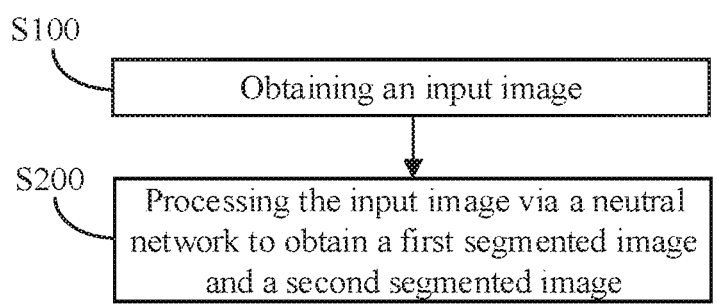
FIG. 1 is a flowchart of an image processing method provided by some embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "a," "an," "the," etc., are not intended to indicate a limitation of quantity, but indicate the presence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The present disclosure is described below with reference to several specific embodiments. In order to keep the following description of the embodiments of the present disclosure clear and concise, detailed descriptions of known functions and known components or elements may be omitted. When any one component or element of an embodiment of the present disclosure appears in more than one of the accompanying drawings, the component or element is denoted by a same or similar reference numeral in each of the drawings.

Image segmentation is a research hotspot in the field of image processing. Image segmentation is a technology that segments an image into several specific regions with unique properties and extracts objects of interest. Medical image segmentation is an important application field of image segmentation. Medical image segmentation refers to extracting the region or boundary of the tissue of interest from the medical image, so that the extracted tissue can be clearly distinguished from other tissues. Medical image segmentation is of great significance to the quantitative analysis of tissues, the formulation of surgical plans and computer-aided diagnosis. In the medical field, deep learning neural networks can be used for medical image segmentation, and can improve the accuracy of image segmentation, reduce the time to extract features, and improve the computational efficiency. Medical image segmentation can be used to extract regions of interest to facilitate the analysis and recognition of medical images.

It should be noted that the present disclosure is illustratively described by taking a medical image as an example, and the technical schemes provided by the embodiments of the present disclosure can also be applied in other fields related to image segmentation requirements.

It should be noted that in the present disclosure, each of the layers, such as the convolution layer, the down-sampling layer and the up-sampling layer, etc., refers to a corresponding processing operation, that is, convolution process, down-sampling process, up-sampling process; and the described modules, sub-networks and the like also refer to corresponding processing operations, and no further description will be given below.

At least one embodiment of the present disclosure provides an image processing method, which includes: obtaining an input image; and processing the input image via a neural network to obtain a first segmented image and a second segmented image. The neural network includes two encoding-decoding networks, the two encoding-decoding networks include a first encoding-decoding network and a second encoding-decoding network, and the input of the first encoding-decoding network includes the input image. The processing the input image via the neural network to obtain the first segmented image and the second segmented image includes: performing a segmentation process on the input image via the first encoding-decoding network, to obtain a first output feature map and the first segmented image; concatenating the first output feature map with at least one selected from the group consisting of the input image and the first segmented image, to obtain an input of the second encoding-decoding network; and performing a segmentation process on the input of the second encoding-decoding network via the second encoding-decoding network, to obtain the second segmented image.

Some embodiments of the present disclosure further provide an image processing device, a neural network, a training method of the neural network, and a storage medium corresponding to the above image processing method.

The image processing method provided by the embodiment of the present disclosure obtains the first segmented image at first and then obtains the second segmented image based on the first segmented image, which can improve the robustness, has high generalization and high precision, and has a more stable segmentation result for images acquired in different light environments and by different imaging devices. Meanwhile, by adoption of an end-to-end CNN model, manual operations can be reduced.

Hereinafter, some embodiments of the present disclosure and examples thereof will be described in detail with reference to the accompanying drawings.

FIG. 1 is a flowchart of an image processing method provided by some embodiments of the present disclosure. For instance, as shown in FIG. 1, the image processing method includes step S100 and step S200.

Step S100: obtaining an input image;

Step S200: processing the input image via a neural network to obtain a first segmented image and a second segmented image.

For instance, in step S100, the input image can be images of various types, for example, including but not limited to medical images. For instance, according to devices used to obtain medical images, medical images can include ultrasound images, X-ray computed tomography (CT), magnetic resonance imaging (MRI) images, digital subtraction angiography (DSA), positron emission computed tomography (PET), etc. According to the content of medical images, medical images can include brain tissue MRI images, spinal cord MRI images, eye fundus images, blood vessel images, pancreas CT images and lung CT images, etc.

For instance, the input image can be acquired by an image acquisition device. In the case where the input image is a medical image, the image acquisition device can include, for example, an ultrasound device, an X-ray device, an MRI device, a nuclear medical device, a medical optical device and a thermal imaging device, etc., without being limited in the embodiments of the present disclosure.

It should be noted that the input image can also be a person image, an image of animals and plants, a landscape image, etc. The input image can also be acquired by an image acquisition device, such as a camera of a smart phone, a camera of a tablet computer, a camera of a personal computer, a lens of a digital camera, a surveillance camera or a webcam, etc.

For instance, the input image can be a grayscale image and can also be a color image. For instance, the size of the input image can be set according to implementation needs, without being limited in the embodiments of the present disclosure.

For instance, the input image can be an initial image directly acquired by the image acquisition device, and can also be an image obtained after the initial image is pre-processed. For instance, in order to avoid the impact of data quality, data imbalance and the like of the input image on the accuracy of image segmentation, before step S100, the image processing method provided by the embodiments of the present disclosure can further include the operation of pre-processing the input image. The pre-process can eliminate irrelevant information or noise information in the input image, so as to facilitate the segmentation of the input image.

For instance, in step S200, the segmentation of the input image via the neural network is to obtain a corresponding segmented image by segmenting the shape of an object (e.g., an organ or a tissue) from the input image. For instance, in some embodiments of the present disclosure, taking the case in which the input image includes a medical image (e.g., an eye fundus image, a lung CT image, etc.) as an example, the first segmented image can correspond to a first region of the input image, and for example, the first segmented image corresponds to an organ or a tissue in the medical image (e.g., the optic disc in the eye fundus image, the lung in the lung CT image, etc.); and the second segmented image can correspond to a second region of the input image, for example, the first region of the input image surrounds the second region of the input image, and for example, the second segmented image corresponds to a structure or a lesion (e.g., the optic cup in the eye fundus image, the pulmonary nodule in the lung CT image, etc.) in the foregoing organ or tissue. For instance, the first segmented image and the second segmented image can be used for medical diagnosis, and for example, can be used for the screening and diagnosis of glaucoma (based on the segmentation of the optic disc and the optic cup), early lung cancer (based on the segmentation of the lung and the pulmonary nodule), etc.

Figure 2:
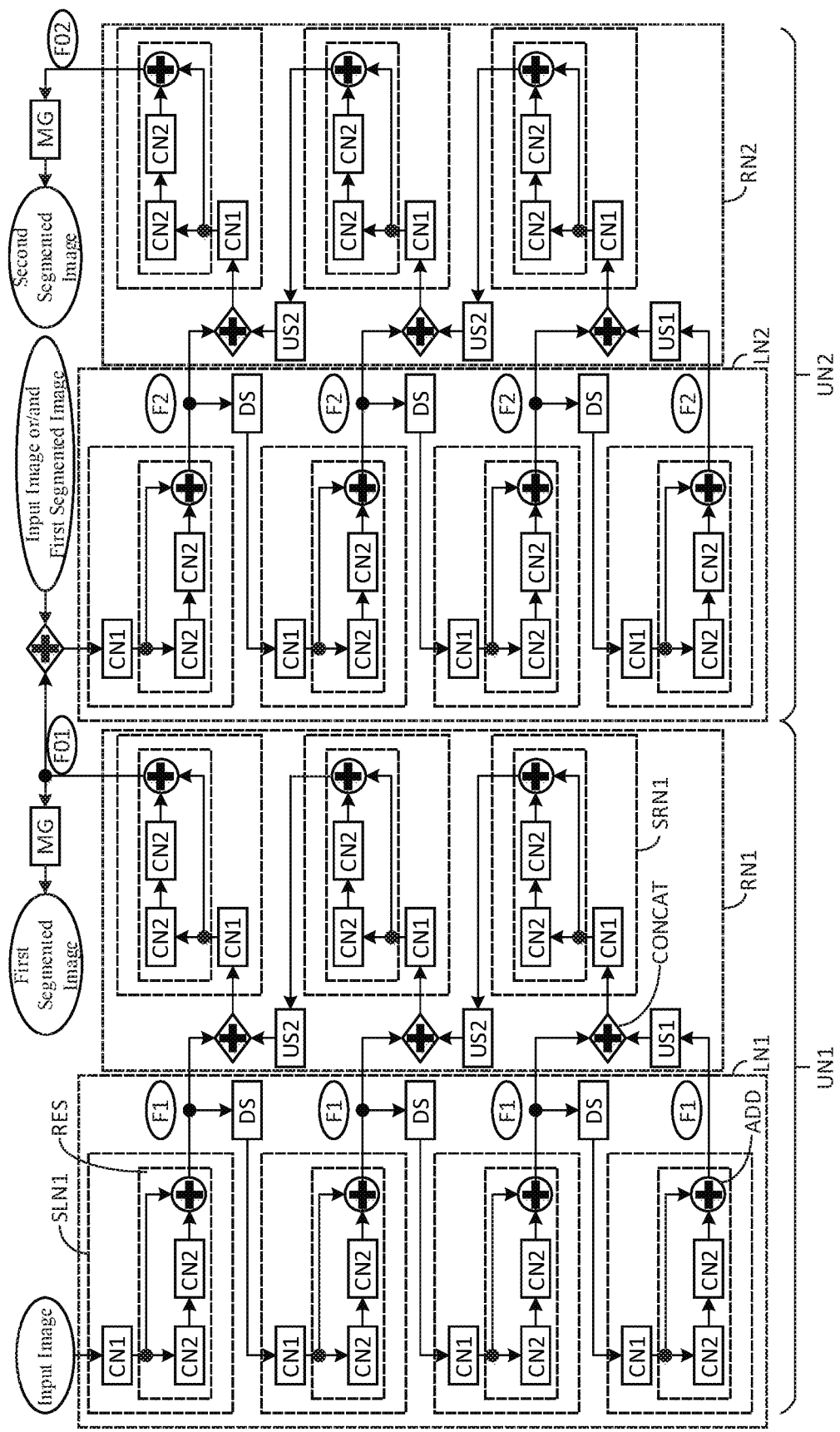
FIG. 2 is a schematic block diagram of an architecture of a neural network in the image processing method as shown in FIG. 1 provided by some embodiments of the present disclosure.
Figure 3:
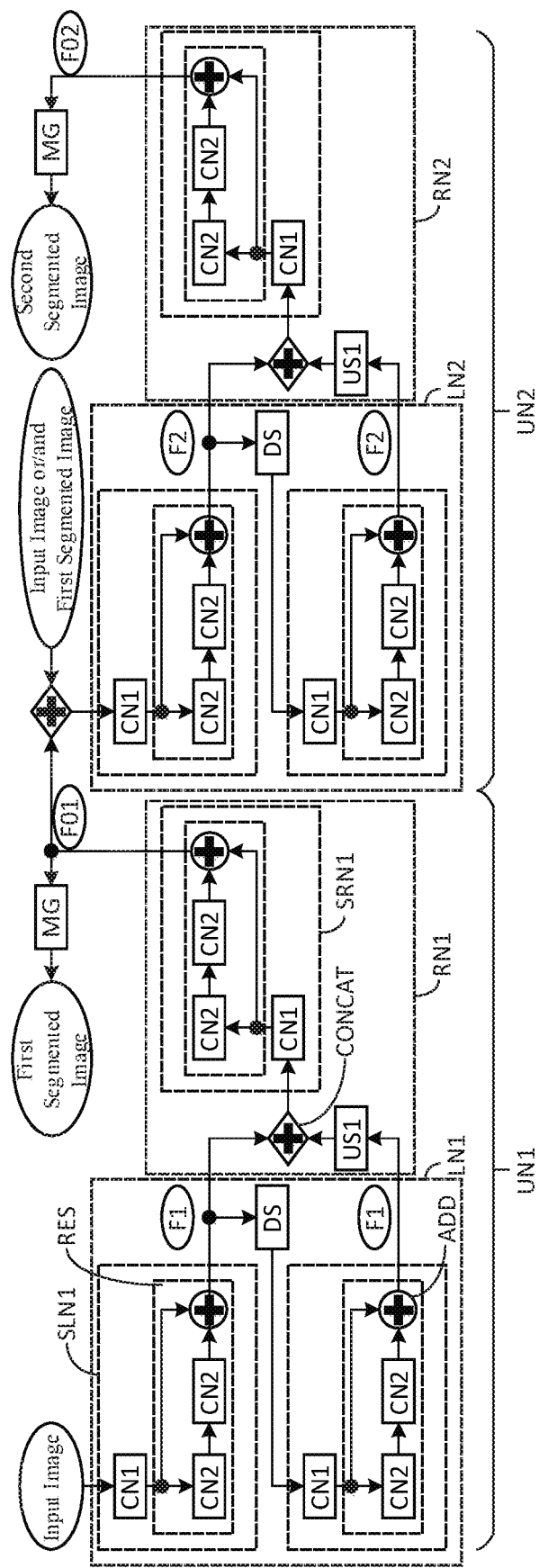
FIG. 3 is a schematic block diagram of another architecture of a neural network in the image processing method as shown in FIG. 1 provided by some embodiments of the present disclosure.
Figure 4:
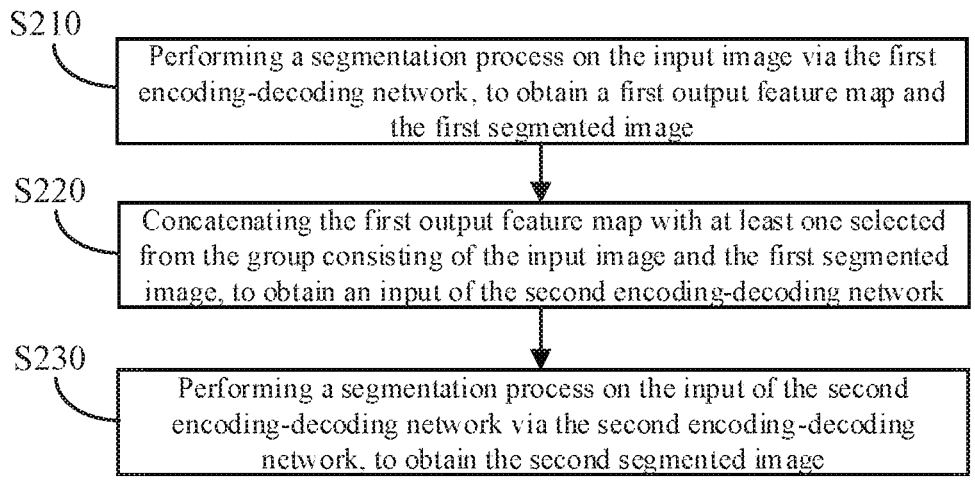
FIG. 4 is an exemplary flowchart of step S200 in the image processing method as shown in FIG. 1 provided by some embodiments of the present disclosure.

FIG. 2 is a schematic block diagram of an architecture of a neural network in the image processing method as shown in FIG. 1 provided by some embodiments of the present disclosure, FIG. 3 is a schematic block diagram of another architecture of a neural network in the image processing method as shown in FIG. 1 provided by some embodiments of the present disclosure, and FIG. 4 is an exemplary flowchart of step S200 in the image processing method as shown in FIG. 1 provided by some embodiments of the present disclosure. Hereinafter, step S200 in the image processing method as shown in FIG. 1 will be described in detail with reference to FIGS. 2, 3 and 4.

With reference to FIGS. 2, 3 and 4, the neural network in the image processing method provided by the embodiments of the present disclosure can include two encoding-decoding networks. The two encoding-decoding networks include a first encoding-decoding network UN1 and a second encoding-decoding network UN2. For instance, as shown in FIGS. 2 and 3, both the first encoding-decoding network UN1 and the second encoding-decoding network UN2 can be U-nets, without being limited in the embodiments of the present disclosure. For instance, the input of the first encoding-decoding network UN1 includes the input image. For instance, as shown in FIG. 4, the processing the input image via the neural network to obtain the first segmented image and the second segmented image, namely step S200, includes step S210 to step S230.

Step S210: performing a segmentation process on the input image via the first encoding-decoding network, to obtain a first output feature map and the first segmented image.

For instance, as shown in FIGS. 2 and 3, the first encoding-decoding network UN1 includes an encoding meta-network LN1 and a decoding meta-network RN1.

Accordingly, the segmentation process of the first encoding-decoding network UN1 includes: performing an encoding process on the input image (namely the input of the first encoding-decoding network) via the encoding meta-network LN1 of the first encoding-decoding network UN1 to obtain a first encoded feature map F1; and performing a decoding process on the first encoded feature map F1 via the decoding meta-network RN1 of the first encoding-decoding network to obtain an output of the first encoding-decoding network UN1. For instance, as shown in FIGS. 2 and 3, the output of the first encoding-decoding network UN1 includes the first segmented image. For instance, as shown in FIGS. 2 and 3, the output of the first encoding-decoding network UN1 can further include a first output feature map F01, and the first output feature map F01 can be used for the processing of the second encoding-decoding network UN2.

For instance, as shown in FIGS. 2 and 3, the encoding meta-network LN1 can include N encoding sub-networks SLN1 and N−1 down-sampling layers DS, where N is an integer and N≥2. The N encoding sub-networks SLN1 are sequentially connected, and each down-sampling layer DS is configured to connect two adjacent encoding sub-networks SLN1, that is, any two adjacent encoding sub-networks SLN1 are connected with each other through one corresponding down-sampling layer DS. For instance, FIG. 2 shows the case in which N>2, and FIG. 3 shows the case in which N=2. It should be noted that FIG. 2 shows the case in which N=4, but it should not be construed as a limitation of the present disclosure. As shown in FIG. 2, in the encoding meta-network LN1 of the first encoding-decoding network UN1, from top to bottom (i.e., from one side close to the input image to one side away from the input image), the encoding meta-network LN1 sequentially includes a first encoding sub-network, a second encoding sub-network, a third encoding sub-network and a fourth encoding sub-network. As shown in FIG. 3, in the encoding meta-network LN1 of the first encoding-decoding network UN1, from top to bottom, the encoding meta-network LN1 sequentially includes a first encoding sub-network and a second encoding sub-network.

The down-sampling layer is configured to perform a down-sampling process. On one hand, the down-sampling layer can be used to reduce the scale of the input image, simplify the computing complexity, and reduce the over-fitting phenomenon to a certain extent. On the other hand, the down-sampling layer can also realize feature compression to extract main features of the input image. The down-sampling layer can reduce the size of feature images but does not change the number of the feature images. For instance, the down-sampling process is used to reduce the size of the feature images, so as to reduce the data size of the feature map. For instance, the down-sampling layer can adopt a down-sampling method, such as max pooling, average pooling, strided convolution, decimation (e.g., selecting fixed pixels) or demuxout (splitting the input image into a plurality of smaller images), to realize the down-sampling process.

For instance, as shown in FIGS. 2 and 3, the encoding process of the encoding meta-network LN1 includes: processing, via the i-th encoding sub-network in the N encoding sub-networks SLN1, an input of the i-th encoding sub-network, to obtain an output of the i-th encoding sub-network1; performing a down-sampling process on the output of the i-th encoding sub-network via a down-sampling layer DS that connects the i-th encoding sub-network with the (i+1)-th encoding sub-network in the N encoding sub-networks SLN1, to obtain a down-sampling output of the i-th encoding sub-network; and processing, via the (i+1)-th encoding sub-network, the down-sampling output of the i-th encoding sub-network, to obtain an output of the (i+1)-th encoding sub-network, where i is an integer and 1≤i≤N−1. The input of the first encoding sub-network in the N encoding sub-networks SLN1 includes the input of the first encoding-decoding network UN1; except the first encoding sub-network, the input of the (i+1)-th encoding sub-network includes the down-sampling output of the i-th encoding sub-network SLN1; and the first encoded feature map F1 includes the output of the N encoding sub-networks SLN1 in the encoding meta-network LN1, that is, the first encoded feature map F1 includes the output of the first encoding sub-network, the output of the second encoding sub-network, the output of the third encoding sub-network, and the output of the fourth encoding sub-network.

For instance, in some examples, the sizes of the input and the output of each encoding sub-network SLN1 are the same.

For instance, as shown in FIGS. 2 and 3, corresponding to the structure of the encoding meta-network LN1, the decoding meta-network RN1 includes N−1 decoding sub-networks SRN1 and N−1 up-sampling layers. As shown in FIG. 2, in the decoding meta-network RN1 of the first encoding-decoding network UN1, from bottom to top, the decoding meta-network RN1 sequentially includes a first decoding sub-network, a second decoding sub-network and a third decoding sub-network. As shown in FIG. 3, in the decoding meta-network RN1 of the first encoding-decoding network UN1, the decoding meta-network RN1 includes a first decoding sub-network.

The up-sampling layer is configured to perform an up-sampling process. For instance, the up-sampling process is used to increase the size of the feature images, so as to increase the data size of the feature map. For instance, the up-sampling layer can adopt an up-sampling method, such as strided transposed convolution or an interpolation algorithm, to realize the up-sampling process. The interpolation algorithm can include, for example, interpolation, bilinear interpolation, bicubic interpolation, etc.

For instance, as shown in FIG. 2, in the case where N>2, the N−1 decoding sub-networks SRN1 are sequentially connected; the N−1 up-sampling layers include a first up-sampling layer US1 and N−2 second up-sampling layers US2; the first up-sampling layer US1 is configured to connect the first decoding sub-network in the N−1 decoding sub-networks SRN1 with the N-th encoding sub-network in the N encoding sub-networks SLN1; and each second up-sampling layer US2 is configured to connect two adjacent decoding sub-networks, that is, any two adjacent decoding sub-networks SRN1 are connected with each other through one corresponding second up-sampling layer US2. Thus, as shown in FIG. 2, in the case where N>2, the decoding process of the decoding meta-network RN1 includes: obtaining an input of the j-th decoding sub-network in the N−1 decoding sub-networks SRN1; and processing, via the j-th decoding sub-network, the input of the j-th decoding sub-network, to obtain an output of the j-th decoding sub-network, where j is an integer and 1≤j≤N−1. The output of the first encoding-decoding network UN1 includes the output of the (N−1)-th decoding sub-network in the N−1 decoding sub-networks SRN1. For instance, as shown in FIG. 2, in the case where N>2, the output of the (N−1)-th decoding sub-network (the third decoding sub-network in the example as shown in FIG. 2) in the N−1 decoding sub-networks SRN1 is the first output feature map F01.

For instance, as shown in FIG. 2, in the case where N>2, when j=1, the obtaining the input of the j-th decoding sub-network (namely the first decoding sub-network) in the N−1 decoding sub-networks SRN1 includes: performing, via the first up-sampling layer US1, an up-sampling process on the output of the N-th encoding sub-network (the fourth decoding sub-network in the example as shown in FIG. 2), to obtain an up-sampling input of the j-th decoding sub-network; and concatenating (as shown by CONCAT in the figure) the up-sampling input of the j-th decoding sub-network with the output of the (N-j)-th encoding sub-network (the third encoding sub-network in the example as shown in FIG. 2) in the N encoding sub-networks SLN1, and taking a concatenate result as the input of the j-th decoding sub-network. When $1<j\leq N-1$, the obtaining the input of the j-th decoding sub-network in the N−1 decoding sub-networks includes: performing, via the second up-sampling layer US2 that connects the j-th decoding sub-network with the (j−1)-th decoding sub-network in the N−1 decoding sub-networks SRN1, an up-sampling process on the output of the (j−1)-th decoding sub-network, to obtain an up-sampling input of the j-th decoding sub-network; and concatenating the up-sampling input of the j-th decoding sub-network with the output of the (N-j)-th encoding sub-network in the N encoding sub-networks SLN1, and taking a concatenate result as the input of the j-th decoding sub-network.

For instance, the size of the up-sampling input of the j-th decoding sub-network is the same as the size of the output of the (N-j)-th encoding sub-network in the N encoding sub-networks SLN1, where $1\leq j<N-1$. For instance, taking the case in which the feature images in the up-sampling input of the j-th decoding sub-network and the output of the (N-j)-th encoding sub-network in the N encoding sub-networks SLN1 are in a matrix of H rows and W columns as an example, the number of the feature images included in the up-sampling input of the j-th decoding sub-network is C1, and the number of the feature images included in the output of the (N-j)-th encoding sub-network in the N encoding sub-networks SLN1 is C2, then the feature map models of the up-sampling input of the j-th decoding sub-network and the output of the (N-j)-th encoding sub-network in the N encoding sub-networks SLN1 are respectively (C1, H, W) and (C2, H, W). Thus, the feature map model of the input of the j-th decoding sub-network obtained by concatenating the up-sampling input of the j-th decoding sub-network with the output of the (N-j)-th encoding sub-network in the N encoding sub-networks SLN1 is (C1+C2, H, W). The number of the feature images included in the input of the j-th decoding sub-network is C1+C2. No limitation will be given in the present disclosure to the order of the feature images in the feature map model of the input of the j-th decoding sub-network. It should be noted that the embodiments of the present disclosure include but are not limited to this case.

It should be noted that in the embodiments of the present disclosure, "connect" can indicate taking the output of the former functional object in two functional objects (for example, the sub-networks, the down-sampling layers, the up-sampling layers, etc.) as the input of the latter functional object in the two functional objects along the direction of signal (e.g., feature map) transmission.

For instance, as shown in FIG. 3, in the case where N=2, the encoding meta-network LN1 includes a first encoding sub-network, a second encoding sub-network, and a down-sampling layer DS that connects the first encoding sub-network with the second encoding sub-network, and the decoding meta-network RN1 includes a first decoding sub-network and a first up-sampling layer US1 that connects the first decoding sub-network with the second encoding sub-network. Thus, as shown in FIG. 3, in the case where N=2, the decoding process of the decoding meta-network RN1 includes: performing, via the first up-sampling layer US1 that connects the first decoding sub-network with the second encoding sub-network, an up-sampling process on an output of the second encoding sub-network, to obtain an up-sampling input of the first decoding sub-network; concatenating the up-sampling input of the first decoding sub-network with the output of the first encoding sub-network, and taking a concatenate result as the input of the first decoding sub-network, wherein the size of the up-sampling input of the first decoding sub-network is the same as the size of the output of the first encoding sub-network; and processing, via the first decoding sub-network, the input of the first decoding sub-network, to obtain an output of the first decoding sub-network, wherein the output of the first encoding-decoding network UN1 includes the output of the first decoding sub-network. For instance, as shown in FIG. 3, in the case where N=2, the output of the first decoding sub-network is the first output feature map F01.

It should be noted that in the embodiments of the present disclosure, the number of the down-sampling layers in the encoding meta-network LN1 is equal to the number of the up-sampling layers in the decoding meta-network RN1. For instance, it can be construed as that: the first down-sampling layer in the encoding meta-network LN1 and the last up-sampling layer in the decoding meta-network RN1 are at the same level; the second down-sampling layer in the encoding meta-network LN1 and the last but one up-sampling layer in the decoding meta-network RN1 are at the same level; . . . ; by parity of reasoning, the last down-sampling layer in the encoding meta-network LN1 and the first up-sampling layer in the decoding meta-network RN1 are at the same level. For instance, in the example as shown in FIG. 2, the down-sampling layer that is configured to connect the first encoding sub-network with the second encoding sub-network is at the same level as the up-sampling layer that is configured to connect the second decoding sub-network with the third decoding sub-network; the down-sampling layer that is configured to connect the second encoding sub-network with the third encoding sub-network is at the same level as the up-sampling layer that is configured to connect the first decoding sub-network with the second decoding sub-network; and the down-sampling layer that is configured to connect the third encoding sub-network with the fourth encoding sub-network is at the same level as the up-sampling layer that is configured to connect the first decoding sub-network and the fourth encoding sub-network. Thus, as for the down-sampling layer and the up-sampling layer at the same level, the down-sampling factor (e.g., a down-sampling factor of 1/(2×2)) of the down-sampling layer corresponds to the up-sampling factor (e.g., correspondingly, an up-sampling factor of 2×2) of the up-sampling layer, that is, in the case where the down-sampling factor of the down-sampling layer is 1/y, the up-sampling factor of the up-sampling layer is y, where y is a positive integer and y is usually greater than or equal to 2. Thus, the size of the up-sampling input of the j-th decoding sub-network can be the same as the size of the output of the (N-j)-th encoding sub-network in the N encoding sub-networks SLN1, where N is an integer and N≥2, and j is an integer and $1\leq j\leq N-1$.

For instance, as shown in FIGS. 2 and 3, each sub-network in the N encoding sub-networks SLN1 of the encoding meta-network LN1 and the N−1 decoding sub-networks SRN1 of the decoding meta-network RN1 can include a first convolution module CN1 and a residual module RES. Thus, as shown in FIGS. 2 and 3, the processing of each sub-network includes: processing, via the first convolution module CN1, an input of a sub-network including the first convolution module CN1, to obtain a first intermediate output; and performing, via the residual module RES, a residual process on the first intermediate output, to obtain an output of the sub-network.

For instance, as shown in FIGS. 2 and 3, the residual module RES can include a plurality of second convolution modules CN2. For instance, the number of the second convolution modules CN2 in each residual model RES can be 2, but the present disclosure is not limited thereto. Thus, as shown in FIGS. 2 and 3, the performing, via the residual module RES, the residual process on the first intermediate output, to obtain the output of the sub-network, includes: processing, via the plurality of second convolution modules CN2, the first intermediate output, to obtain a second intermediate output; and performing a residual connection addition process (as shown by ADD in the figure) on the first intermediate output and the second intermediate output, to obtain the output of the residual model RES, namely the output of the sub-network. For instance, as shown in FIGS. 2 and 3, the output of each encoding sub-network belongs to the first encoded feature map F1.

For instance, the size of the first intermediate output is the same as the size of the second intermediate output. Thus, after the residual connection addition process, the size of the output of the residual model RES (namely the output of the corresponding sub-network) is the same as the size of the input of the residual model RES (namely the corresponding first intermediate output).

For instance, in some examples, each convolution module in the first convolution modules CN1 and the second convolution modules CN2 described above can include a convolution layer, an activation layer and a batch normalization layer. Thus, the processing of each convolution module can include: a convolution process, an activation process and a batch normalization process.

The convolution layer is the core layer of the CNN. The convolution layer can apply a number of convolution kernels (also referred to as filters) to the input thereof (e.g., the input image), so as to extract multiple types of features of the input. For instance, the convolution layer can include 3×3 convolution kernels. The convolution layer can include a plurality of convolution kernels, and each convolution kernel can extract one type of features. The convolution kernels are generally initialized in the form of a random decimal matrix. During the training process of the CNN, the convolution kernels will obtain reasonable weights through learning. The result obtained by applying a plurality of convolution kernels to the input image is called a feature map, and the number of feature images is equal to the number of convolution kernels. Each feature map consists of a number of neurons in rectangular arrangement. The neurons of a same feature map share weights, and the weights shared here are convolution kernels. The feature image outputted by the convolution layer of one stage can be inputted to the adjacent convolution layer of next stage and to be processed again to obtain a new feature map.

For instance, the activation layer includes an activation function. The activation function is used to introduce non-linear factors into the CNN, so that the CNN can solve complex problems better. The activation function can include a rectified linear unit (ReLU) function, a sigmoid function, or a hyperbolic tangent function (tanh function), etc. The ReLU function is an unsaturated nonlinear function, and the sigmoid function and the tanh function are saturated nonlinear functions. For instance, the activation layer can be used alone as one layer of the CNN, or the activation layer can also be included in a convolution layer.

For instance, the batch normalization layer is configured to perform a batch normalization process on the feature map, so as to change the grayscale values of pixels of the feature map into a predetermined range, thereby reducing computing difficulty and improving contrast. For instance, the predetermined range may be [−1, 1]. For instance, the processing manner of the batch normalization layer can be referred to the common batch normalization process, and no further description will be given here.

For instance, in some examples, the sizes of the input and the output of the first convolution module CN1 are the same. Thus, the sizes of the input and the output of each encoding sub-network in the encoding meta-network LN1 are the same, and the sizes of the input and the output of each decoding sub-network in the decoding meta-network RN1 are the same.

For instance, as shown in FIGS. 2 and 3, the first encoding-decoding network UN1 can further include a merge module MG. The merge module MG in the first encoding-decoding network UN1 is configured to process the first output feature map F01 to obtain the first segmented image. For instance, in some examples, the merge module MG in the first encoding-decoding network UN1 can adopt 1×1 convolution kernels to process the first output feature map F01 to obtain the first segmented image. It should be noted that the embodiments of the present disclosure include but are not limited to this case.

Step S220: concatenating the first output feature map with at least one selected from the group consisting of the input image and the first segmented image, to obtain an input of the second encoding-decoding network.

For instance, the size of the first output feature map F01 is the same as the size of the input image. For instance, the process of concatenating the first output feature map F01 with the input image and/or the first segmented image (namely at least one of the input image or the first segmented image) can be referred to the foregoing relevant description of the process of concatenating the up-sampling input of the j-th decoding sub-network with the output of the (N-j)-th encoding sub-network in the N encoding sub-networks SLN1. No further description will be given here.

Step S230: performing a segmentation process on the input of the second encoding-decoding network via the second encoding-decoding network, to obtain the second segmented image.

For instance, as shown in FIGS. 2 and 3, the second encoding-decoding network UN2 includes an encoding meta-network LN2 and a decoding meta-network RN2. Accordingly, the segmentation process of the second encoding-decoding network UN2 includes: performing an encoding process on the input of the second encoding-decoding network via the encoding meta-network LN2 of the second encoding-decoding network UN2 to obtain a second encoded feature map F2; and performing a decoding process on the second encoded feature map F2 via the decoding meta-network RN2 of the second encoding-decoding network UN2 to obtain an output of the second encoding-decoding network UN2. The second encoded feature map F2 includes the output of the N encoding sub-networks SLN1 in the encoding meta-network LN2. For instance, as shown in FIGS. 2 and 3, the output of the second encoding-decoding network UN2 can include the second segmented image.

For instance, as shown in FIGS. 2 and 3, the structures and the process of the encoding meta-network LN2 and the decoding meta-network RN2 of the second encoding-decoding network UN2 can be referred to relevant description of the structures and the process of the encoding meta-network LN1 and the decoding meta-network RN1 of the first encoding-decoding network UN1, respectively, and no further description will be given here.

It should be noted that both FIGS. 2 and 3 show the case in which the second encoding-decoding network UN2 and the first encoding-decoding network UN1 have the same structure (namely including the same number of encoding sub-networks and the same number of decoding sub-networks), but the embodiments of the present disclosure are not limited thereto. That is to say, the second encoding-decoding network UN2 can also have a similar structure as the first encoding-decoding network UN1, but the number of the encoding sub-networks in the second encoding-decoding network UN2 can be different from the number of the encoding sub-networks in the first encoding-decoding network UN1.

For instance, as shown in FIGS. 2 and 3, the second encoding-decoding network UN2 can further include a merge module MG. For instance, the performing the segmentation process on the input of the second encoding-decoding network UN2 via the second encoding-decoding network UN2, to obtain the second segmented image, includes: performing the segmentation process on the input of the second encoding-decoding network UN2 via the second encoding-decoding network UN2, to obtain a second output feature map F02; and processing the second output feature map F02 via the merge module MG in the second encoding-decoding network UN2, to obtain the second segmented image.

For instance, as shown in FIGS. 2 and 3, the merge module MG in the second encoding-decoding network UN2 is configured to process the second output feature map F02 to obtain the second segmented image. For instance, in some examples, the merge module MG in the second encoding-decoding network UN2 can adopt 1×1 convolution kernels to process the second output feature map F02 to obtain the second segmented image. It should be noted that the embodiments of the present disclosure include but are not limited to this case.

Figure 5:
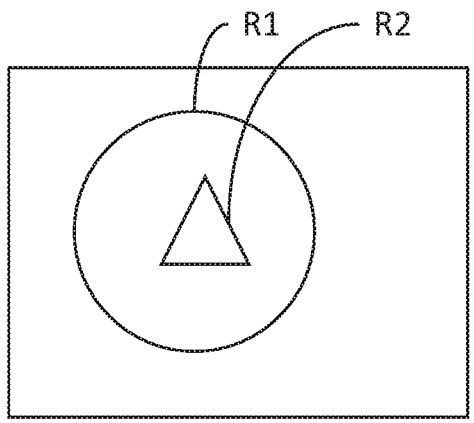
FIG. 5 is a schematic diagram of a first region and a second region in an input image provided by some embodiments of the present disclosure.

For instance, in some examples, the first segmented image corresponds to a first region of the input image, and the second segmented image corresponds to a second region of the input image. FIG. 5 is a schematic diagram of a first region and a second region in an input image provided by some embodiments of the present disclosure. For instance, as shown in FIG. 5, a first region R1 of the input image surrounds a second region R2 of the input image, that is, the second region R2 is within the first region R1. For instance, in this case, the first segmented image and the second segmented image can be used for medical diagnosis, and for example, can be used for the screening and diagnosis of glaucoma (based on the segmentation of the optic disc and the optic cup, in which the first region corresponds to the optic disc and the second region corresponds to the optic cup), early lung cancer (based on the segmentation of the lung and the pulmonary nodule, in which the first region corresponds to the lung and the second region corresponds to the pulmonary nodule), etc. For instance, in the case where the first segmented image and the second segmented image are used for the screening and diagnosis of glaucoma, the area ratio of the optic cup to the optical disc (i.e., the cup-to-disc ratio) can be calculated based on the segmentation of the optic disc and the optic cup, and then the screening and diagnosis can be performed according to the relative magnitude of the area ratio and a preset threshold. No further description will be given here. It should be noted that the embodiments of the present disclosure include but are not limited to this case.

It should be noted that both the shapes and the sizes of the first region R1 and the second region R2 in the input image as shown in FIG. 5 are illustrative, no limitation will be given here in the embodiments of the present disclosure. In addition, it should be understood that the first region in the input image can include a communicated region (as shown in FIG. 5), and in this case, the second region in the input image can include a communicated region (as shown in FIG. 5) and can also include a plurality of discrete regions; and the first region in the input image can also include a plurality of discrete first sub-regions, and in this case, the second region in the input image can include a communicated region (located in one first sub-region) and can also include a plurality of discrete second sub-regions (located in one first sub-region or in some discrete first sub-regions). It should also be noted that the case in which the second region is within the first region can include a case in which an edge of the second region does not overlap with an edge of the first region and can also include a case in which the edge of the second region at least partially overlaps with the edge of the first region. No limitation will be given here in the embodiments of the present disclosure.

It should be noted that in the embodiments of the present disclosure (not limited to the present embodiment), the same or similar functional objects can have the same or similar structure or process, but the parameters of the same or similar functional objects can be the same or different. No limitation will be given here in the embodiments of the present disclosure.

The image processing method provided by the embodiment of the present disclosure obtains the first segmented image at first and then obtains the second segmented image based on the first segmented image, which can improve the robustness, has high generalization and high precision, and has a more stable segmentation result for images acquired in different light environments and by different imaging devices. Meanwhile, by adoption of an end-to-end CNN model, manual operations can be reduced.

At least one embodiment of the present disclosure further provides a neural network, which can be used to execute the image processing method provided by the above embodiments. For instance, the structure of the neural network can be referred to the architecture of the neural network as shown in FIG. 2 or 3. As shown in FIGS. 2 and 3, the neural network provided by the embodiments of the present disclosure includes two encoding-decoding networks. The two encoding-decoding networks include a first encoding-decoding network UN1 and a second encoding-decoding network UN2. The neural network further includes a concatenating layer (as shown by CONCAT for connecting the first encoding-decoding network UN1 with the second encoding-decoding network UN2 in FIGS. 2 and 3). For instance, as shown in FIGS. 2 and 3, both the first encoding-decoding network UN1 and the second encoding-decoding network UN2 can be U-nets, without being limited in the embodiments of the present disclosure. For instance, the input of the first encoding-decoding network UN1 includes an input image. For instance, the neural network is configured to process the input image to obtain a first segmented image and a second segmented image.

For instance, as shown in FIGS. 2 and 3, the first encoding-decoding network UN1 is configured to perform a segmentation process on the input image to obtain a first output feature map F01 and a first segmented image.

For instance, as shown in FIGS. 2 and 3, the first encoding-decoding network UN1 includes an encoding meta-network LN1 and a decoding meta-network RN1. The encoding meta-network LN1 of the first encoding-decoding network UN1 is configured to perform an encoding process on the input image (namely the input of the first encoding-decoding network) to obtain a first encoded feature map F1; and the decoding meta-network RN1 of the first encoding-decoding network UN1 is configured to perform a decoding process on the first encoded feature map F1 to obtain an output of the first encoding-decoding network UN1. For instance, as shown in FIGS. 2 and 3, the output of the first encoding-decoding network UN1 includes the first segmented image. For instance, as shown in FIGS. 2 and 3, the output of the first encoding-decoding network UN1 can further include a first output feature map F01, and the first output feature map F01 can be used for the processing of the second encoding-decoding network UN2.

For instance, as shown in FIGS. 2 and 3, the encoding meta-network LN1 can include N encoding sub-networks SLN1 and N−1 down-sampling layers DS, where N is an integer and N≥2. The N encoding sub-networks SLN1 are sequentially connected, and each down-sampling layer DS is configured to connect two adjacent encoding sub-networks SLN1, that is, any two adjacent encoding sub-networks SLN1 are connected with each other through one corresponding down-sampling layer DS. For instance, FIG. 2 shows the case in which N>2, and FIG. 3 shows the case in which N=2. It should be noted that FIG. 2 shows the case in which N=4, but it should not be construed as a limitation of the present disclosure. As shown in FIG. 2, in the encoding meta-network LN1 of the first encoding-decoding network UN1, from top to bottom (i.e., from one side close to the input image to one side away from the input image), the encoding meta-network LN1 sequentially includes a first encoding sub-network, a second encoding sub-network, a third encoding sub-network and a fourth encoding sub-network. As shown in FIG. 3, in the encoding meta-network LN1 of the first encoding-decoding network UN1, from top to bottom, the encoding meta-network LN1 sequentially includes a first encoding sub-network and a second encoding sub-network.

For instance, as shown in FIGS. 2 and 3, the i-th encoding sub-network in the N encoding sub-networks SLN1 is configured to process an input of the i-th encoding sub-network to obtain an output of the i-th encoding sub-network; the down-sampling layer DS that connects the i-th encoding sub-network and the (i+1)-th encoding sub-network in the N encoding sub-networks SLN1 is configured to perform a down-sampling process on the output of the i-th encoding sub-network to obtain a down-sampling output of the i-th encoding sub-network; the (i+1)-th encoding sub-network is configured to process the down-sampling output of the i-th encoding sub-network to obtain an output of the (i+1)-th encoding sub-network, where i is an integer and 1≤i≤N−1. The input of the first encoding sub-network in the N encoding sub-networks SLN1 includes the input of the first encoding-decoding network UN1; except the first encoding sub-network, the input of the (i+1)-th encoding sub-network includes the down-sampling output of the i-th encoding sub-network SLN1; and the first encoded feature map F1 includes the output of the N encoding sub-networks SLN1 in the encoding meta-network LN1, that is, the first encoded feature map F1 includes the output of the first encoding sub-network, the output of the second encoding sub-network, the output of the third encoding sub-network, and the output of the fourth encoding sub-network.

For instance, in some examples, the sizes of the input and the output of each encoding sub-network SLN1 are the same.

For instance, as shown in FIGS. 2 and 3, corresponding to the structure of the encoding meta-network LN1, the decoding meta-network RN1 includes N−1 decoding sub-networks SRN1 and N−1 up-sampling layers. As shown in FIG. 2, in the decoding meta-network RN1 of the first encoding-decoding network UN1, from bottom to top, the decoding meta-network RN1 sequentially includes a first decoding sub-network, a second decoding sub-network and a third decoding sub-network. As shown in FIG. 3, in the decoding meta-network RN1 of the first encoding-decoding network UN1, the decoding meta-network RN1 includes a first decoding sub-network.

For instance, as shown in FIG. 2, in the case where N>2, the N−1 decoding sub-networks SRN1 are sequentially connected; the N−1 up-sampling layers include a first up-sampling layer US1 and N−2 second up-sampling layers US2; the first up-sampling layer US1 is configured to connect the first decoding sub-network in the N−1 decoding sub-networks SRN1 with the N-th encoding sub-network in the N encoding sub-networks SLN1; and each second up-sampling layer US2 is configured to connect two adjacent decoding sub-networks, that is, any two adjacent decoding sub-networks SRN1 are connected with each other through one corresponding second up-sampling layer US2. For instance, in this case, the first encoding-decoding network UN1 further includes N−1 sub-concatenating layers (as shown by CONCAT in the decoding meta-network RN1 in FIG. 2) corresponding to the N−1 decoding sub-networks SRN1 in the decoding meta-network RN1.

For instance, as shown in FIG. 2, the j-th decoding sub-network in the N−1 decoding sub-network SRN1 is configured to process an input of the j-th decoding sub-network to obtain an output of the j-th decoding sub-network, where j is an integer and 1≤j≤N−1. And the output of the first encoding-decoding network UN1 includes the output of the (N−1)-th decoding sub-network in the N−1 decoding sub-networks SRN1. For instance, as shown in FIG. 2, in the case where N>2, the output of the (N−1)-th decoding sub-network (the third decoding sub-network in the example as shown in FIG. 2) in the N−1 decoding sub-networks SRN1 is the first output feature map F01.

For instance, as shown in FIG. 2, the first up-sampling layer US1 is configured to perform an up-sampling process on the output of the N-th encoding sub-network to obtain an up-sampling input of the first decoding sub-network; and the second up-sampling layer US2 that connects the j-th decoding sub-network and the (j−1)-th decoding sub-network in the N−1 decoding sub-networks SRN1 is configured to perform an up-sampling process on the output of the (j−1)-th decoding sub-network to obtain an up-sampling input of the j-th decoding sub-network, where j is an integer and 1≤j≤N−1.

For instance, as shown in FIG. 2, the j-th sub-concatenating layer in the N−1 sub-concatenating layers is configured to concatenate the up-sampling input of the j-th decoding sub-network with the output of the (N−j)-th encoding sub-network in the N encoding sub-networks SLN1 to obtain a concatenate result which serves as the input of the j-th decoding sub-network, where j is an integer and 1≤j≤N−1.

For instance, the size of the up-sampling input of the j-th decoding sub-network is the same as the size of the output of the (N-j)-th encoding sub-network in the N encoding sub-networks SLN1, where $1 \leq j \leq N-1$.

For instance, as shown in FIG. 3, in the case where N=2, the encoding meta-network LN1 includes a first encoding sub-network, a second encoding sub-network, and a down-sampling layer DS that connects the first encoding sub-network with the second encoding sub-network, and the decoding meta-network RN1 includes a first decoding sub-network and a first up-sampling layer US1 that connects the first decoding sub-network with the second encoding sub-network. For instance, in this case, the first encoding-decoding network UN1 further includes a first sub-concatenating layer (as shown by CONCAT in the decoding meta-network RN1 in FIG. 3) corresponding to the first decoding sub-network SRN1 of the decoding meta-network RN1.

For instance, as shown in FIG. 3, in the case where N=2, the first up-sampling layer US1 that connects the first decoding sub-network and the second encoding sub-network is configured to perform an up-sampling process on an output of the second encoding sub-network to obtain an up-sampling input of the first decoding sub-network; the first sub-concatenating layer is configured to concatenate the up-sampling input of the first decoding sub-network with an output of the first encoding sub-network to obtain a concatenate result which serves as the input of the first decoding sub-network, wherein the size of the up-sampling input of the first decoding sub-network is the same as the size of the output of the first encoding sub-network; and the first decoding sub-network is configured to process the input of the first decoding sub-network to obtain an output of the first decoding sub-network, wherein the output of the first encoding-decoding network UN1 includes the output of the first decoding sub-network. For instance, as shown in FIG. 3, in the case where N=2, the output of the first decoding sub-network is the first output feature map F01.

It should be noted that in the embodiments of the present disclosure, the number of the down-sampling layers in the encoding meta-network LN1 is equal to the number of the up-sampling layers in the decoding meta-network RN1. For instance, it can be construed as that: the first down-sampling layer in the encoding meta-network LN1 and the last up-sampling layer in the decoding meta-network RN1 are at the same level; the second down-sampling layer in the encoding meta-network LN1 and the last but one up-sampling layer in the decoding meta-network RN1 are at the same level; . . . ; by parity of reasoning, the last down-sampling layer in the encoding meta-network LN1 and the first up-sampling layer in the decoding meta-network RN1 are at the same level. For instance, in the example as shown in FIG. 2, the down-sampling layer that is configured to connect the first encoding sub-network with the second encoding sub-network is at the same level as the up-sampling layer that is configured to connect the second decoding sub-network with the third decoding sub-network; the down-sampling layer that is configured to connect the second encoding sub-network with the third encoding sub-network is at the same level as the up-sampling layer that is configured to connect the first decoding sub-network with the second decoding sub-network; and the down-sampling layer that is configured to connect the third encoding sub-network with the fourth encoding sub-network is at the same level as the up-sampling layer that is configured to connect the first decoding sub-network and the fourth encoding sub-network. Thus, as for the down-sampling layer and the up-sampling layer at the same level, the down-sampling factor (e.g., a down-sampling factor of $1/(2\times2)$) of the down-sampling layer corresponds to the up-sampling factor (e.g., correspondingly, an up-sampling factor of $2\times2$) of the up-sampling layer, that is, in the case where the down-sampling factor of the down-sampling layer is $1/y$, the up-sampling factor of the up-sampling layer is y, where y is a positive integer and y is usually greater than or equal to 2. Thus, the size of the up-sampling input of the j-th decoding sub-network can be the same as the size of the output of the (N-j)-th encoding sub-network in the N encoding sub-networks SLN1, where N is an integer and $N \geq 2$, and j is an integer and $1 \leq j \leq N-1$.

For instance, as shown in FIGS. 2 and 3, each sub-network in the N encoding sub-networks SLN1 of the encoding meta-network LN1 and the N-1 decoding sub-networks SRN1 of the decoding meta-network RN1 can include a first convolution module CN1 and a residual module RES. For instance, as shown in FIGS. 2 and 3, the first convolution module CN1 is configured to process an input of a sub-network including the first convolution module CN1 to obtain a first intermediate output; and the residual module RES is configured to perform a residual process on the first intermediate output to obtain an output of the sub-network.

For instance, as shown in FIGS. 2 and 3, the residual module RES can include a plurality of second convolution modules CN2 and a residual addition layer (as shown by ADD in FIGS. 2 and 3). For instance, the number of the second convolution modules CN2 in each residual module RES can be 2, but the present disclosure is not limited thereto. For instance, as shown in FIGS. 2 and 3, the plurality of second convolution modules CN2 are configured to process the first intermediate output to obtain a second intermediate output; and the residual addition layer is configured to perform a residual connection addition process on the first intermediate output and the second intermediate output to obtain an output of the residual module RES, namely the output of the sub-network. For instance, as shown in FIGS. 2 and 3, the output of each encoding sub-network belongs to the first encoded feature map F1.

For instance, the size of the first intermediate output is the same as the size of the second intermediate output. Thus, after being processed by the residual addition layer, the size of the output of the residual module RES (namely the output of the corresponding sub-network) is the same as the size of the input of the residual module RES (namely the corresponding first intermediate output).

For instance, in some examples, each convolution module in the first convolution modules CN1 and the second convolution modules CN2 described above can include a convolution layer, an activation layer and a batch normalization layer. The convolution layer is configured to perform a convolution process, the activation layer is configured to perform an activation process, and the batch normalization layer is configured to perform a batch normalization process. For instance, details can be referred to the foregoing relevant description, and no further description will be given here.

For instance, in some examples, the sizes of the input and the output of the first convolution module CN1 are the same. Thus, the sizes of the input and the output of each encoding sub-network in the encoding meta-network LN1 are the same, and the sizes of the input and the output of each decoding sub-network in the decoding meta-network RN1 are the same.

For instance, as shown in FIGS. 2 and 3, the first encoding-decoding network UN1 can further include a merge module MG. The merge module MG in the first encoding-decoding network UN1 is configured to process the first output feature map F01 to obtain the first segmented image. For instance, in some examples, the merge module MG in the first encoding-decoding network UN1 can adopt 1×1 convolution kernels to process the first output feature map F01 to obtain the first segmented image. It should be noted that the embodiments of the present disclosure include but are not limited to this case.

For instance, as shown in FIGS. 2 and 3, the concatenating layer is configured to concatenate the first output feature map F01 with at least one selected from the group consisting of the input image and the first segmented image to obtain an input of the second encoding-decoding network. For instance, the size of the first output feature map F01 is the same as the size of the input image.

For instance, as shown in FIGS. 2 and 3, the second encoding network UN2 is configured to perform a segmentation process on the input of the second encoding-decoding network to obtain the second segmented image.

For instance, as shown in FIGS. 2 and 3, the second encoding-decoding network UN2 includes an encoding meta-network LN2 and a decoding meta-network RN2. The encoding meta-network LN2 of the second encoding-decoding network UN2 is configured to perform an encoding process on the input of the second encoding-decoding network to obtain a second encoded feature map F2; and the decoding meta-network RN2 of the second encoding-decoding network UN2 is configured to by perform an decoding process on the second encoded feature map F2 to obtain an output of the second encoding-decoding network UN2. The second encoded feature map F2 includes the output of the N encoding sub-networks SLN1 in the encoding meta-network LN2. For instance, as shown in FIGS. 2 and 3, the output of the second encoding-decoding network UN2 can include the second segmented image.

For instance, as shown in FIGS. 2 and 3, the structure and the function of the encoding meta-network LN2 and the decoding meta-network RN2 of the second encoding-decoding network UN2 can be referred to relevant description of the structure and the function of the encoding meta-network LN1 and the decoding meta-network RN1 of the first encoding-decoding network UN1, respectively, and no further description will be given here.

It should be noted that both FIGS. 2 and 3 show the case in which the second encoding-decoding network UN2 and the first encoding-decoding network UN1 have the same structure (namely including the same number of encoding sub-networks and the same number of decoding sub-networks), but the embodiments of the present disclosure are not limited thereto. That is to say, the second encoding-decoding network UN2 can also have a similar structure as the first encoding-decoding network UN1, but the number of the encoding sub-networks in the second encoding-decoding network UN2 can be different from the number of the encoding sub-networks in the first encoding-decoding network UN1.

For instance, as shown in FIGS. 2 and 3, the second encoding-decoding network UN2 can further include a merge module MG. For instance, that the second encoding-decoding network UN2 is configured to perform a segmentation process on the input of the second encoding-decoding network UN2 to obtain the second segmented image, includes: the second encoding-decoding network UN2 is configured to perform the segmentation process on the input of the second encoding-decoding network UN2 to obtain a second output feature map F02; and the merge module MG in the second encoding-decoding network UN2 is configured to process the second output feature map F02 to obtain the second segmented image. For instance, in some examples, the merge module MG in the second encoding-decoding network UN2 can adopt 1×1 convolution kernels to process the second output feature map F02 to obtain the second segmented image. It should be noted that the embodiments of the present disclosure include but are not limited to this case.

The technical effects of the neural network provided by the embodiments of the present disclosure can be referred to the related description of the image processing method provided by the above embodiments, and no further description will be given here.

Figure 6:
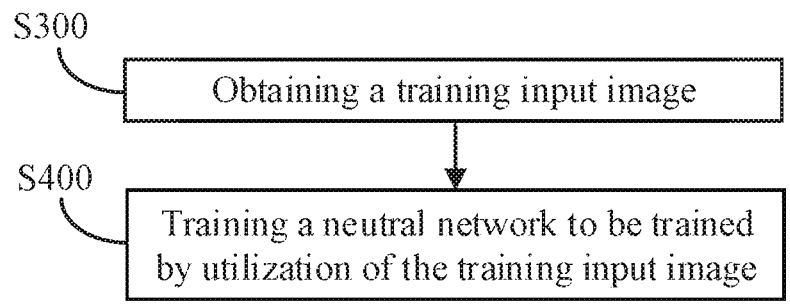
FIG. 6 is a flowchart of a training method of a neural network provided by some embodiments of the present disclosure.

At least one embodiment of the present disclosure further provides a training method of a neural network. FIG. 6 is a flowchart of a training method of a neural network provided by some embodiments of the present disclosure. For instance, as shown in FIG. 6, the training method includes step S300 and step S400.

Step S300: obtaining a training input image.

For instance, similar to the input image in the above step S100, the training input image can also be images of various types, for example, including but not limited to medical images. For instance, the training input image can be acquired by an image acquisition device. In the case where the input image is a medical image, the image acquisition device can include, for example, an ultrasound device, an X-ray device, an MRI device, a nuclear medical device, a medical optical device and a thermal imaging device, etc., without being limited in the embodiments of the present disclosure. For instance, the training input image can also be a person image, an image of animals and plants, a landscape image, etc. The training input image can also be acquired by an image acquisition device, such as a camera of a smart phone, a camera of a tablet computer, a camera of a personal computer, a lens of a digital camera, a surveillance camera or a webcam, etc. For instance, the training input image can also be a sample image in a pre-prepared sample set. For instance, the sample set further includes standard segmented images (namely ground truth) of the sample images. For instance, the training input image can be a grayscale image and can also be a color image.

For instance, in some examples, the obtaining the training input image, namely step S300, can include: obtaining an initial training input image; and performing a pre-process and a data augment process on the initial training input image, to obtain the training input image. For instance, the original training input image is generally an image directly acquired by the image acquisition device. In order to avoid the impact of data quality, data imbalance and the like of the initial training input image on the training process, the initial training input image can be subjected to a pre-process and a data augment process. For instance, the pre-process can eliminate irrelevant information or noise information in the initial training input image, so as to facilitate the segmentation of the training input image. The pre-process can include, for example, the zooming of the initial training input image. Image zooming includes rescaling the initial training input image and cropping the image to a preset size, so as to facilitate subsequent image segmentation. It should be noted that the pre-process can further include gamma correction, image de-redundancy (cutting out redundant parts of the image), image enhancement (image adaptive color equalization, image alignment, color correction, etc.) or noise reduction filtering, etc., and for example, can be referred to the conventional processing methods, and no further description will be given here. Image enhancement includes enriching the data of the training input image by means of, for example, random cropping, rotation, flipping, skewing, affine transformation, etc., to increase the difference of training input images, reduce over-fitting phenomena during image processing, and improve the robustness and the generalization of the CNN model.

Step S400 training a neural network to be trained by utilization of the training input image, to obtain the neural network in the image processing method provided by any one of the embodiments of the present disclosure.

For instance, the structure of the neural network to be trained can be same as that of the neural network as shown in FIG. 2 or that of the neural network as shown in FIG. 3, and the embodiments of the present disclosure include but are not limited to this case. For instance, after being trained by the training method, the neural network to be trained can execute the image processing method provided by any one of the foregoing embodiments, that is, the neural network obtained by utilization of the training method can execute the image processing method provided by any one of the foregoing embodiments of the present disclosure.

Figure 7:
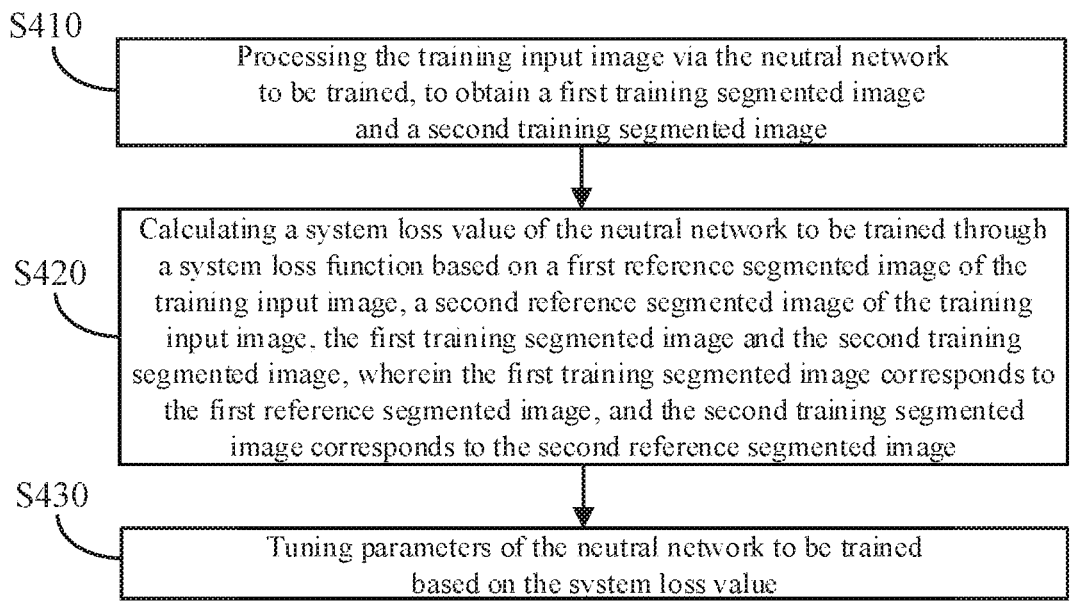
FIG. 7 is an exemplary flowchart of step S400 in the training method as shown in FIG. 6 provided by some embodiments of the present disclosure.

FIG. 7 is an exemplary flowchart of the step S400 in the training method as shown in FIG. 6 provided by some embodiments of the present disclosure. For instance, as shown in FIG. 7, the training the neural network to be trained by utilization of the training input image, namely step S400, includes step S410 to step S430.

Step S410: processing the training input image via the neural network to be trained, to obtain a first training segmented image and a second training segmented image.

For instance, the specific process of step S410 can be referred to relevant description of the above step S200. The neural network to be trained, the training input image, the first training segmented image and the second training segmented image in step S410 correspond to the neural network, the input image, the first segmented image and the second segmented image in step S200, respectively, and the specific details will not be repeated here.

For instance, in the training process, the initial parameters of the neural network to be trained can be random numbers. For instance, the random numbers conform to Gaussian distribution. It should be noted that no limitation will be given here in the embodiment of the present disclosure.

Step S420: calculating a system loss value of the neural network to be trained through a system loss function based on a first reference segmented image of the training input image, a second reference segmented image of the training input image, the first training segmented image and the second training segmented image, wherein the first training segmented image corresponds to the first reference segmented image and the second training segmented image corresponds to the second reference segmented image.

For instance, in some examples, the training input image is a sample image in a pre-prepared sample set. For instance, the first reference segmented image and the second reference segmented image are respectively a first standard segmented image and a second standard segmented image corresponding to the sample image in the sample set.

For instance, that the first training segmented image corresponds to the first reference segmented image means that the first training segmented image and the first reference segmented image correspond to a same region (e.g., a first region) of the training input image; and that the second training segmented image corresponds to the second reference segmented image means that the second training segmented image and the second reference segmented image correspond to a same region (e.g., a second region) of the training input image. For instance, in some examples, the first region of the training input image surrounds the second region of the training input image, that is, the second region of the training input image is within the first region of the training input image.

For instance, in some examples, the system loss function can include a first segmentation loss function and a second segmentation loss function. For instance, the system loss function can be expressed as:

$$L=\lambda_{01} \cdot L_{01}+\lambda_{02} \cdot L_{02},$$

where $L_{01}$ and $L_{02}$ indicate the first segmentation loss function and the second segmentation loss function, respectively, and $\lambda_{01}$ and $\lambda_{02}$ indicate a weight of the first segmentation loss function and a weight of the second segmentation loss function in the system loss function, respectively.

For instance, in some examples, the first segmentation loss function can include a binary cross entropy loss function and a soft dice loss function. For instance, the first segmentation loss function can be expressed as:

$$L_{01}=\lambda_{11} \cdot L_{11}+\lambda_{12} \cdot L_{21},$$

where $L_{01}$ indicates the first segmentation loss function, $L_{11}$ represents the binary cross entropy loss function in the first segmentation loss function, $\lambda_{11}$ represents a weight of the binary cross entropy loss function in the first segmentation loss function, $L_{21}$ indicates the soft dice loss function in the first segmentation loss function, and $\lambda_{12}$ represents a weight of the soft dice loss function in the first segmentation loss function.

For instance, the binary cross entropy loss function $L_{11}$ in the first segmentation loss function can be expressed as:

$$L_{11} = -\sum_{m1}\sum_{n1}[y_{m1n1} \cdot \log\, x_{m1n1} + (1 - y_{m1n1}) \cdot \log\, (1 - x_{m1n1})];$$

and the soft dice loss function $L_{21}$ in the first segmentation loss function can be expressed as:

$$L_{21} = -\sum_{m1}\sum_{n1}[(2x_{m1n1}y_{m1n1})/(x_{m1n1}^2 + y_{m1n1}^2)],$$

where $x_{m1n1}$ indicates a value of a pixel in an m1-th row and an n1-th column in the first training segmented image, and $y_{m1n1}$ indicates a value of a pixel in an m1-th row and an n1-th column in the first reference segmented image.

For instance, in the case where the value of $L_{11}$ or $L_{21}$ is large, the value of $L_{01}$ is large, which indicates that the difference between the first training segmented image and the first reference segmented image is large; and in the case where the value of $L_{11}$ or $L_{21}$ is small, the value of $L_{01}$ is small, which indicates that the difference between the first training segmented image and the first reference segmented image is small. In the training process, the training goal is to minimize the system loss value. Therefore, in the training process of the neural network to be trained, the minimizing the system loss value includes minimizing the first segmentation loss function value.

For instance, in some examples, the second segmentation loss function can also include a binary cross entropy loss function and a soft dice loss function. For instance, the second segmentation loss function can be expressed as:

$$L_{02}=\lambda_{21} \cdot L_{12}+\lambda_{22} \cdot L_{22},$$

where $L_{02}$ indicates the second segmentation loss function, $L_{12}$ represents the binary cross entropy loss function in the second segmentation loss function, $\lambda_{21}$ represents a weight of the binary cross entropy loss function in the second segmentation loss function, $L_{22}$ indicates the soft dice loss function in the second segmentation loss function, and $\lambda_{22}$ represents a weight of the soft dice loss function in the second segmentation loss function.

For instance, the binary cross entropy loss function $L_{12}$ in the second segmentation loss function can be expressed as:

$$L_{12} = -\sum_{m2}\sum_{n2}[y_{m2n2} \cdot \log x_{m2n2} + (1 - y_{m2n2}) \cdot \log (1 - x_{m2n2})];$$

and the soft dice loss function $L_{22}$ in the second segmentation loss function can be expressed as:

$$L_{22} = -\sum_{m2}\sum_{n2}[(2x_{m2n2}y_{m2n2})/(x_{m2n2}^2 + y_{m2n2}^2)],$$

where $x_{m2n2}$ indicates a value of a pixel in an m2-th row and an n2-th column in the second training segmented image, and $y_{m2n2}$ indicates a value of a pixel in an m2-th row and an n2-th column in the second reference segmented image.

For instance, in the case where the value of $L_{12}$ or $L_{22}$ is large, the value of $L_{02}$ is large, which indicates that the difference between the second training segmented image and the second reference segmented image is large; and in the case where the value of $L_{12}$ or $L_{22}$ is small, the value of $L_{02}$ is small, which indicates that the difference between the second training segmented image and the second reference segmented image is small Therefore, in the training process of the neural network to be trained, the minimizing the system loss value also includes minimizing the second segmentation loss function value.

Step S430: tuning parameters of the neural network to be trained based on the system loss value.

For instance, the training process of the neural network to be trained can further include an optimization function. The optimization function can calculate error values of the parameters of the neural network to be trained according to the system loss value calculated by the system loss function, and tune the parameters of the neural network to be trained according to the error values. For instance, the optimization function can calculate the error values of the parameters of the neural network to be trained by adoption of a stochastic gradient descent (SGD) algorithm or a batch gradient descent (BGD) algorithm, etc.

For instance, the above training method can further include: determining whether the training of the neural network to be trained satisfies a predetermined condition; if not, executing the above training process (namely step S410 to step S430) again; and if yes, stopping the above training process and obtaining a trained neural network. For instance, in one example, the above predetermined condition is that the system loss values corresponding to two (or more) consecutive training input images are not significantly reduced any longer. For instance, in another example, the above predetermined condition is that the training times or the training cycles of the neural network to be trained reaches a preset number. No limitation will be given here in the embodiments of the present disclosure.

For instance, the first training segmented image and the second training segmented image outputted by the trained neural network can be similar to the first reference segmented image and the second reference segmented image, respectively. That is, the trained neural network can perform a relatively standard image segmentation on the training input image.

It should be noted that in the present disclosure, for instance, the neural network to be trained and each of various layers or modules (e.g., the convolution module, the up-sampling layer, the down-sampling layer, etc.) therein execute the procedures/methods of the corresponding processes, respectively, and can be implemented by means of software, firmware, hardware, etc. Moreover, the above embodiments only illustratively describe the training process of the neural network to be trained. It should be known by those skilled in the art that in the training phase, a large number of sample images need to be used to train the neural network; and at the same time, in the training process of each sample image, multiple iterations can be included to modify the parameters of the neural network to be trained. Moreover, for instance, the training phase further includes fine-tuning the parameters of the neural network to be trained to obtain more optimized parameters.

The training method of the neural network provided by the embodiments of the present disclosure can train the neural network adopted in the image processing method provided by the embodiments of the present disclosure, and the neural network trained by the training method can obtain the first segmented image at first and then obtain the second segmented image based on the first segmented image, which can improve the robustness, has high generalization and precision, and has more stable segmentation result for images acquired in different light environments and by different imaging devices. Meanwhile, by adoption of an end-to-end CNN model, manual operations can be reduced.

Figure 8:
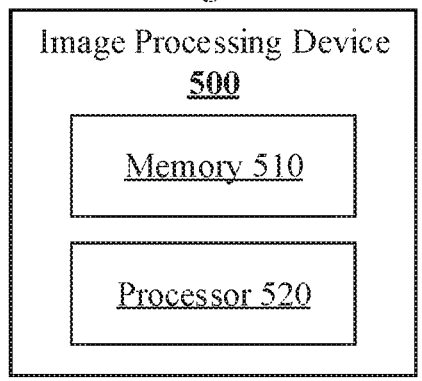
FIG. 8 is a schematic block diagram of an image processing device provided by an embodiment of the present disclosure.

At least one embodiment of the present disclosure further provides an image processing device. FIG. 8 is a schematic block diagram of an image processing device provided by an embodiment of the present disclosure. For instance, as shown in FIG. 8, the image processing device 500 includes a memory 510 and a processor 520. For instance, the memory 510 is configured to store computer readable instructions non-transitorily, and the processor 520 is configured to execute the computer readable instructions. Upon the computer readable instructions being executed by the processor 520, the image processing method and/or the training method of the neural network provided by any one of the embodiments of the present disclosure is executed.

For instance, the memory 510 and the processor 520 can communicate with each other directly or indirectly. For instance, components such as the memory 510 and the processor 520 can communicate with each other via network connection. The network can include a wireless network, a wired network, and/or any combination of the wireless network and the wired network. The network can include a local area network, the Internet, a telecommunication network, the Internet of Things based on the Internet and/or the telecommunication network, and/or any combination of the above networks, etc. The wired network, for example, can communicate by means of twisted pair, coaxial cable or optical fiber transmission, etc. The wireless network, for example, can adopt a communication mode such as 3G/4G/5G mobile communication network, Bluetooth, Zigbee or WiFi, etc. The present disclosure does not limit the type and function of the network.

For instance, the processor 520 can control other components in the image processing device to realize desired functions. The processor 520 can be an element having data processing capability and/or program execution capability, such as a central processing unit (CPU), a tensor processing unit (TPU), or a graphics processing unit (GPU). The CPU can have an X86 or ARM architecture, etc. The GPU can be integrated directly on the motherboard alone or built into the Northbridge chip of the motherboard. The GPU can also be built into the CPU.

For instance, the memory 510 can include any combination of one or more computer program products, and the computer programs can include a computer readable storage medium of diverse forms, such as a volatile memory and/or a non-volatile memory. The volatile memory, for instance, can include a random access memory (RAM) and/or a cache, etc. The non-volatile memory, for example, can include a read-only memory (ROM), a hard disk, an erasable programmable read-only memory (EPROM), a portable compact disk read-only memory (CD-ROM), a USB memory, or a flash memory, etc.

For instance, one or a plurality of computer instructions can be stored on the memory 510, and the processor 520 can execute the computer instructions to realize various functions. The computer readable storage medium can also store various applications and various data, such as the training input image, the first reference segmented image, the second reference segmented image, and various data used and/or generated by the applications.

For instance, when some computer instructions stored on the memory 510 are executed by the processor 520, one or more steps in the image processing method as described above can be executed. Moreover, for instance, when some other computer instructions stored on the memory 510 are executed by the processor 520, one or more steps in the training method of the neural network as described above can be executed.

For instance, detailed description of the processing procedures of the image processing method can be referred to relevant description of the embodiments of the above image processing method, and detailed description of the processing procedures of the training method of the neural network can be referred to relevant description of the embodiments of the above training method of the neural network. No further description will be given here.

It should be noted that the image processing device provided by the embodiments of the present disclosure is illustrative but not limitative. According to actual application requirements, the image processing device can further include other conventional components or structures. For example, in order to realize necessary functions of the image processing device, those skilled in the art can set other conventional components or structures according to specific application scenarios. No limitation will be given here in the embodiments of the present disclosure.

The technical effects of the image processing device provided by the embodiments of the present disclosure can be referred to the related description of the image processing method and the training method of the neural network provided by the above embodiments. No further description will be given here.

Figure 9:
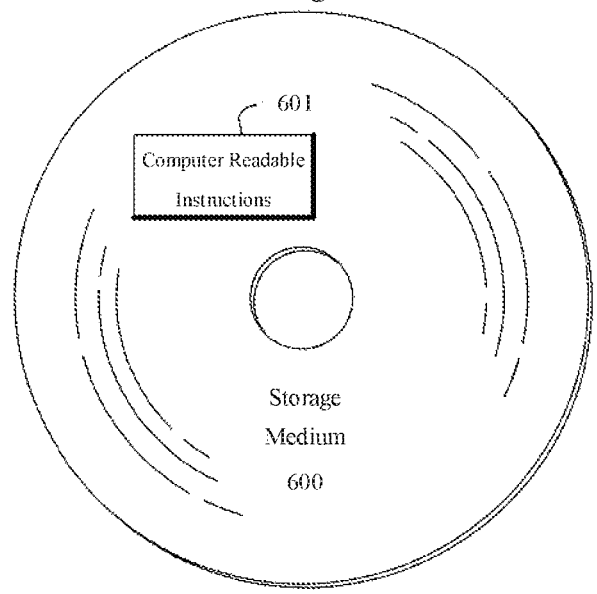
FIG. 9 is a schematic diagram of a storage medium provided by an embodiment of the present disclosure.

At least one embodiment of the present disclosure further provides a storage medium. FIG. 9 is a schematic diagram of a storage medium provided by an embodiment of the present disclosure. For instance, as shown in FIG. 9, the storage medium 600 is configured to store computer readable instructions 601 non-transitorily. Upon the non-transitory computer readable instructions 601 being executed by a computer (including a processor), instructions of the image processing method provided by any one of the embodiments of the present disclosure can be executed, or instructions of the training method of the neural network provided by any one of the embodiments of the present disclosure can be executed.

For instance, one or more computer instructions can be stored on the storage medium 600. Some computer instructions stored on the storage medium 600 can be, for example, instructions used for implementing one or more steps in the above image processing method. Some other computer instructions stored on the storage medium can be, for example, instructions used for implementing the above training method of the neural network.

For instance, the storage medium can include a storage component of a tablet, a hard disk of a personal computer, a random access memory (RAM), a read-only memory (ROM), an erasable programmable read-only memory (EPROM), a portable compact disk read-only memory (CD-ROM), a flash memory, or any combination of the above-mentioned storage media, or other suitable storage medium.

The technical effects of the storage medium provided by the embodiments of the present disclosure can be referred to the related description of the image processing method and the training method of the neural network provided by the above embodiments. No further description will be given here.

For the disclosure, the following statements should be noted:

(1) The accompanying drawings related to the embodiment(s) of the present disclosure involve only the structure(s) in connection with the embodiment(s) of the present disclosure, and other structure(s) can be referred to common design(s).

(2) In case of no conflict, the embodiments of the present disclosure and the features in the embodiments can be combined with each other to obtain new embodiments.

What have been described above are only specific implementations of the present disclosure, and the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be determined based on the protection scope of the claims.

What is claimed is:

1. An image processing method, comprising:
obtaining an input image; and
processing the input image via a neural network to obtain a first segmented image and a second segmented image, wherein
the neural network comprises two encoding-decoding networks, the two encoding-decoding networks comprises a first encoding-decoding network and a second encoding-decoding network, and an input of the first encoding-decoding network comprises the input image; and
the processing the input image via the neural network to obtain the first segmented image and the second segmented image, comprises:
performing a segmentation process on the input image via the first encoding-decoding network, to obtain a first output feature map and the first segmented image;
concatenating the first output feature map with at least one selected from the group consisting of the input image and the first segmented image, to obtain an input of the second encoding-decoding network; and performing a segmentation process on the input of the second encoding-decoding network via the second encoding-decoding network, to obtain the second segmented image,
wherein each encoding-decoding network in the two encoding-decoding networks comprises an encoding meta-network and a decoding meta-network;
the segmentation process of the first encoding-decoding network comprises:
performing an encoding process on the input image via the encoding meta-network of the first encoding-decoding network to obtain a first encoded feature map; and
performing a decoding process on the first encoded feature map via the decoding meta-network of the first encoding-decoding network to obtain an output of the first encoding-decoding network, wherein the output of the first encoding-decoding network comprises the first segmented image; and
the segmentation process of the second encoding-decoding network comprises:
performing an encoding process on the input of the second encoding-decoding network via the encoding meta-network of the second encoding-decoding network to obtain a second encoded feature map; and
performing a decoding process on the second encoded feature map via the decoding meta-network of the second encoding-decoding network to obtain an output of the second encoding-decoding network, wherein the output of the second encoding-decoding network comprises the second segmented image.

2. The image processing method according to claim 1, wherein the encoding meta-network comprises N encoding sub-networks and N−1 down-sampling layers, the N encoding sub-networks are sequentially connected, each of the N−1 down-sampling layers is configured to connect two adjacent encoding sub-networks, N is an integer and N≥2; and
the encoding process of the encoding meta-network comprises:
processing, via an i-th encoding sub-network in the N encoding sub-networks, an input of the i-th encoding sub-network, to obtain an output of the i-th encoding sub-network;
performing a down-sampling process on the output of the i-th encoding sub-network via a down-sampling layer that connects the i-th encoding sub-network with an (i+1)-th encoding sub-network in the N encoding sub-networks, to obtain a down-sampling output of the i-th encoding sub-network; and
processing, via the (i+1)-th encoding sub-network, the down-sampling output of the i-th encoding sub-network, to obtain an output of the (i+1)-th encoding sub-network;
wherein i is an integer and 1≤i≤N−1, an input of the first encoding sub-network in the N encoding sub-networks comprises the input of the first encoding-decoding network or the input of the second encoding-decoding network; except the first encoding sub-network, the input of the (i+1)-th encoding sub-network comprises the down-sampling output of the i-th encoding sub-network; and the first encoded feature map or the second encoded feature map comprises the output of the N encoding sub-networks.

3. The image processing method according to claim 2, wherein in a case where N>2,
the decoding meta-network comprises N−1 decoding sub-networks and N−1 up-sampling layers, the N−1 decoding sub-networks are sequentially connected, the N−1 up-sampling layers comprise a first up-sampling layer and N−2 second up-sampling layers, the first up-sampling layer is configured to connect a first decoding sub-network in the N−1 decoding sub-networks with an N-th encoding sub-network in the N encoding sub-networks, and each of the second up-sampling layers is configured to connect two adjacent decoding sub-networks; and
the decoding process of the decoding meta-network comprises:
obtaining an input of a j-th decoding sub-network in the N−1 decoding sub-networks; and
processing, via the j-th decoding sub-network, the input of the j-th decoding sub-network, to obtain an output of the j-th decoding sub-network;
wherein j is an integer and 1≤j≤N−1, the output of the first encoding-decoding network or the output of the second encoding-decoding network comprises an output of an (N−1)-th decoding sub-network in the N−1 decoding sub-networks;
in a case where j=1, the obtaining the input of the j-th decoding sub-network in the N-1 decoding sub-networks comprises:
performing, via the first up-sampling layer, an up-sampling process on an output of the N-th encoding sub-network, to obtain an up-sampling input of the j-th decoding sub-network; and
concatenating the up-sampling input of the j-th decoding sub-network with an output of a (N−j)-th encoding sub-network in the N encoding sub-networks, and taking a concatenate result as the input of the j-th decoding sub-network; and
in a case where 1<j≤N−1, the obtaining the input of the j-th decoding sub-network in the N−1 decoding sub-networks comprises:
performing, via the second up-sampling layer that connects a j-th decoding sub-network with a (j−1)-th decoding sub-network in the N−1 decoding sub-networks, an up-sampling process on an output of a (j−1)-th decoding sub-network, to obtain an up-sampling input of the j-th decoding sub-network; and
concatenating the up-sampling input of the j-th decoding sub-network with an output of a (N−j)-th encoding sub-network in the N encoding sub-networks, and taking a concatenate result as the input of the j-th decoding sub-network.

4. The image processing method according to claim 3, wherein a size of the up-sampling input of the j-th decoding sub-network is the same as a size of the output of the (N−j)-th encoding sub-network, where 1≤j≤N−1.

5. The image processing method according to claim 2, wherein in a case where N=2,
the encoding meta-network further comprises a second encoding sub-network, and the decoding meta-network comprises a first decoding sub-network and a first up-sampling layer that connects the first decoding sub-network with the second encoding sub-network; and
the decoding process of the decoding meta-network comprises:
performing, via the first up-sampling layer that connects the first decoding sub-network with the second encoding sub-network, an up-sampling process on an output of the second encoding sub-network, to obtain an up-sampling input of the first decoding sub-network;

concatenating the up-sampling input of the first decoding sub-network with an output of the first encoding sub-network, and taking a concatenate result as the input of the first decoding sub-network, wherein a size of the up-sampling input of the first decoding sub-network is the same as a size of the output of the first encoding sub-network; and processing, via the first decoding sub-network, the input of the first decoding sub-network, to obtain an output of the first decoding sub-network;

wherein the output of the first encoding-decoding network or the output of the second encoding-decoding network comprises the output of the first decoding sub-network.

6. The image processing method according to claim 3, wherein each sub-network in the N encoding sub-networks and the N−1 decoding sub-networks comprises: a first convolution module and a residual module; and a processing of each sub-network comprises:

processing, via the first convolution module, an input of a sub-network comprising the first convolution module, to obtain a first intermediate output; and performing, via the residual module, a residual process on the first intermediate output, to obtain an output of the sub-network.

7. The image processing method according to claim 6, wherein the residual module comprises a plurality of second convolution modules; and the performing, via the residual module, the residual process on the first intermediate output, to obtain the output of the sub-network, comprises:

processing, via the plurality of second convolution modules, the first intermediate output, to obtain a second intermediate output; and performing a residual connection addition process on the first intermediate output and the second intermediate output, to obtain the output of the sub-network.

8. The image processing method according to claim 3, wherein the sizes of the input and the output of each decoding sub-network in the decoding meta-network are the same, and the sizes of the input and the output of each encoding sub-network in the encoding meta-network are the same.

9. The image processing method according to claim 1, wherein each encoding-decoding network in the two encoding-decoding networks further comprises a merge module;

the merge module in the first encoding-decoding network is configured to process the first output feature map to obtain the first segmented image; and the performing the segmentation process on the input of the second encoding-decoding network via the second encoding-decoding network, to obtain the second segmented image, comprises:

performing the segmentation process on the input of the second encoding-decoding network via the second encoding-decoding network, to obtain a second output feature map; and processing the second output feature map via the merge module in the second encoding-decoding network, to obtain the second segmented image.

10. The image processing method according to claim 1, wherein the first segmented image corresponds to a first region of the input image, the second segmented image corresponds to a second region of the input image, and the first region of the input image surrounds the second region of the input image.

11. A training method of a neural network, comprising:

obtaining a training input image; and training a neural network to be trained by utilization of the training input image, to obtain the neural network in the image processing method according to claim 1.

12. The training method according to claim 11, wherein the training the neural network to be trained by utilization of the training input image comprises:

processing the training input image via the neural network to be trained, to obtain a first training segmented image and a second training segmented image;

calculating a system loss value of the neural network to be trained through a system loss function based on a first reference segmented image of the training input image, a second reference segmented image of the training input image, the first training segmented image and the second training segmented image; and tuning parameters of the neural network to be trained based on the system loss value, wherein the first training segmented image corresponds to the first reference segmented image, and the second training segmented image corresponds to the second reference segmented image.

13. The training method according to claim 12, wherein the system loss function comprises a first segmentation loss function and a second segmentation loss function; and each segmentation loss function in the first segmentation loss function and the second segmentation loss function comprises: a binary cross entropy loss function and a soft dice loss function.

14. The training method according to claim 13, wherein the first segmentation loss function is expressed as:

$$L_{01} = \lambda_{11} \cdot L_{11} + \lambda_{12} \cdot L_{21},$$

where $L_{01}$ indicates the first segmentation loss function, $L_{11}$ represents the binary cross entropy loss function in the first segmentation loss function, $\lambda_{11}$ represents a weight of the binary cross entropy loss function in the first segmentation loss function, $L_{21}$ indicates the soft dice loss function in the first segmentation loss function, and $\lambda_{12}$ represents a weight of the soft dice loss function in the first segmentation loss function;

the binary cross entropy loss function $L_{11}$ in the first segmentation loss function is expressed as:

$$L_{11} = -\sum_{m1}\sum_{n1}[y_{m1n1} \cdot \log x_{m1n1} + (1 - y_{m1n1}) \cdot \log(1 - x_{m1n1})],$$

the soft dice loss function $L_{21}$ in the first segmentation loss function is expressed as:

$$L_{21} = -\sum_{m1}\sum_{n1}[(2x_{m1n1}y_{m1n1})/(x_{m1n1}^2 + y_{m1n1}^2)],$$

where $x_{m1n1}$ indicates a value of a pixel in an m1-th row and an n1-th column in the first training segmented image, and ymini indicates a value of a pixel in an m1-th row and an n1-th column in the first reference segmented image; and the second segmentation loss function is expressed as:

$$L_{００}=\lambda_{21}\cdot L_{12}+\lambda_{22}\cdot L_{22},$$

where $L_{02}$ indicates the second segmentation loss function, $L_{12}$ represents the binary cross entropy loss function in the second segmentation loss function, $\lambda_{21}$ represents a weight of the binary cross entropy loss function in the second segmentation loss function, $L_{22}$ indicates the soft dice loss function in the second segmentation loss function, and $\lambda_{22}$ represents a weight of the soft dice loss function in the second segmentation loss function;

the binary cross entropy loss function Lie in the second segmentation loss function is expressed as:

$$L_{12} = -\sum_{m2}\sum_{n2}[y_{m2n2}\cdot \log\ x_{m2n2} + (1-y_{m2n2})\cdot \log\ (1-x_{m2n2})],$$

the soft dice loss function L22 in the second segmentation loss function is expressed as:

$$L_{22} = -\sum_{m2}\sum_{n2}[(2x_{m2n2}y_{m2n2})/(x_{m2n2}^2 + y_{m2n2}^2)],$$

where $x_{m2n2}$ indicates a value of a pixel in an m2-th row and an n2-th column in the second training segmented image, and $y_{m2n2}$ indicates a value of a pixel in an m2-th row and an n2-th column in the second reference segmented image.

15. The training method according to claim 13, wherein the system loss function is expressed as:

$$L=\lambda_{01}\cdot L_{01}+\lambda_{02}\cdot L_{02},$$

where $L_{01}$ and $L_{02}$ indicate the first segmentation loss function and the second segmentation loss function, respectively, and $\lambda_{01}$ and $\lambda_{02}$ indicate a weight of the first segmentation loss function and a weight of the second segmentation loss function in the system loss function, respectively.

16. The training method according to claim 11, wherein the obtaining the training input image comprises:
obtaining an initial training input image; and
performing a pre-process and a data augment process on the initial training input image, to obtain the training input image.

17. An image processing device, comprising:
a memory, configured to store computer readable instructions non-transitorily; and
a processor, configured to execute the computer readable instructions, wherein upon the computer readable instructions being executed by the processor, an image processing method is executed, and the image processing method comprises:
obtaining an input image; and
processing the input image via a neural network to obtain a first segmented image and a second segmented image, wherein
the neural network comprises two encoding-decoding networks, the two encoding-decoding networks comprises a first encoding-decoding network and a second encoding-decoding network, and an input of the first encoding-decoding network comprises the input image; and
the processing the input image via the neural network to obtain the first segmented image and the second segmented image, comprises:
performing a segmentation process on the input image via the first encoding-decoding network, to obtain a first output feature map and the first segmented image;
concatenating the first output feature map with at least one selected from the group consisting of the input image and the first segmented image, to obtain an input of the second encoding-decoding network; and
performing a segmentation process on the input of the second encoding-decoding network via the second encoding-decoding network, to obtain the second segmented image,
wherein each encoding-decoding network in the two encoding-decoding networks comprises an encoding meta-network and a decoding meta-network;
the segmentation process of the first encoding-decoding network comprises:
performing an encoding process on the input image via the encoding meta-network of the first encoding-decoding network to obtain a first encoded feature map; and
performing a decoding process on the first encoded feature map via the decoding meta-network of the first encoding-decoding network to obtain an output of the first encoding-decoding network, wherein the output of the first encoding-decoding network comprises the first segmented image; and
the segmentation process of the second encoding-decoding network comprises:
performing an encoding process on the input of the second encoding-decoding network via the encoding meta-network of the second encoding-decoding network to obtain a second encoded feature map; and
performing a decoding process on the second encoded feature map via the decoding meta-network of the second encoding-decoding network to obtain an output of the second encoding-decoding network, wherein the output of the second encoding-decoding network comprises the second segmented image.

18. A storage medium, storing computer readable instructions non-transitorily, wherein upon the computer readable instructions stored non-transitorily being executed by a computer, instructions for the image processing method according to claim 1 are executed.

* * * * *

UNITED STATES PATENT AND TRADEMARK OFFICE
CERTIFICATE OF CORRECTION

PATENT NO. : 11,816,870 B2
APPLICATION NO. : 16/970131
DATED : November 14, 2023
INVENTOR(S) : Xinyue Hu It is certified that error appears in the above-identified patent and that said Letters Patent is hereby corrected as shown below:

In the Claims

Column 36, Line 65, that portion of the sentence reading "ymini" should read -- $y_{m1n1}$ --.

Signed and Sealed this
Twenty-seventh Day of February, 2024

Katherine Kelly Vidal
*Director of the United States Patent and Trademark Office*